United States Patent [19]
Fukui et al.

[11] Patent Number: 6,005,618
[45] Date of Patent: Dec. 21, 1999

[54] IMAGE PICK-UP DEVICE WITH CONTROL CIRCUIT THAT PROVIDES A VARIABLE HORIZONTAL SYNCHRONIZING SIGNAL

[75] Inventors: Hiroshi Fukui; Kiyoshi Seitoh, both of Kanagawa, Japan

[73] Assignee: Sony Corporation, Tokyo, Japan

[21] Appl. No.: 08/615,283

[22] PCT Filed: Jun. 28, 1995

[86] PCT No.: PCT/JP95/01512

§ 371 Date: Jul. 1, 1996

§ 102(e) Date: Jul. 1, 1996

[87] PCT Pub. No.: WO96/04751

PCT Pub. Date: Feb. 15, 1996

[30] Foreign Application Priority Data

Jul. 29, 1994 [JP] Japan .................................. P6-179321

[51] Int. Cl.⁶ .......................... H04N 5/228; H04N 5/335
[52] U.S. Cl. .................. 348/296; 348/222; 348/312; 348/322
[58] Field of Search ..................................... 348/207, 220, 348/221, 222, 229, 230, 296, 297–299, 311, 312–314, 320–324, 362–364; H04N 5/228, 5/335

[56] References Cited

U.S. PATENT DOCUMENTS

| | | |
|---|---|---|
| 4,805,024 | 2/1989 | Suzuki et al. . |
| 5,157,502 | 10/1992 | Nakajima .......................... 358/213.19 |
| 5,422,670 | 6/1995 | Fukui ...................................... 348/296 |
| 5,614,949 | 3/1997 | Suzuki et al. ........................... 348/296 |

*Primary Examiner*—Wendy Garber
*Assistant Examiner*—Ngoc-Yen Vu
*Attorney, Agent, or Firm*—Jay H. Maioli

[57] ABSTRACT

An image pick-up apparatus and imaging system wherein a position sensor 3 detects position of a moving object 2 transferred along a transfer path 1 to deliver a trigger signal TRIG-IN to a control unit 20 and an image taking-in unit 30. At the image taking-in unit 30, external synchronizing signals EXT-HD, EXT-VD are delivered from a synchronizing signal generating section 31 to a synchronizing signal generating section 21 of the control unit 20. In addition, write enable signal WE corresponding to the trigger signal TRIG-IN is delivered, from a write enable signal preparation section 33, to a memory 32 and to a modulated HD signal generating section 22 of the control unit 20. The control unit 20 generates a modulated horizontal synchronizing signal TG-HD in accordance with the trigger signal TRIG-IN by the modulated HD signal generating section 22 to deliver it to a CCD camera 10, and to control output timing of a video signal VIDEO from the CCD camera 10 on the basis of the write enable signal WE. The CCD camera 10 delivers the video signal VIDEO to the memory 32 of the image taking-in unit 30 at a timing based on control from the modulated HD signal generating section 22. The memory 32 stores the video signal VIDEO from the CCD camera 10.

13 Claims, 27 Drawing Sheets

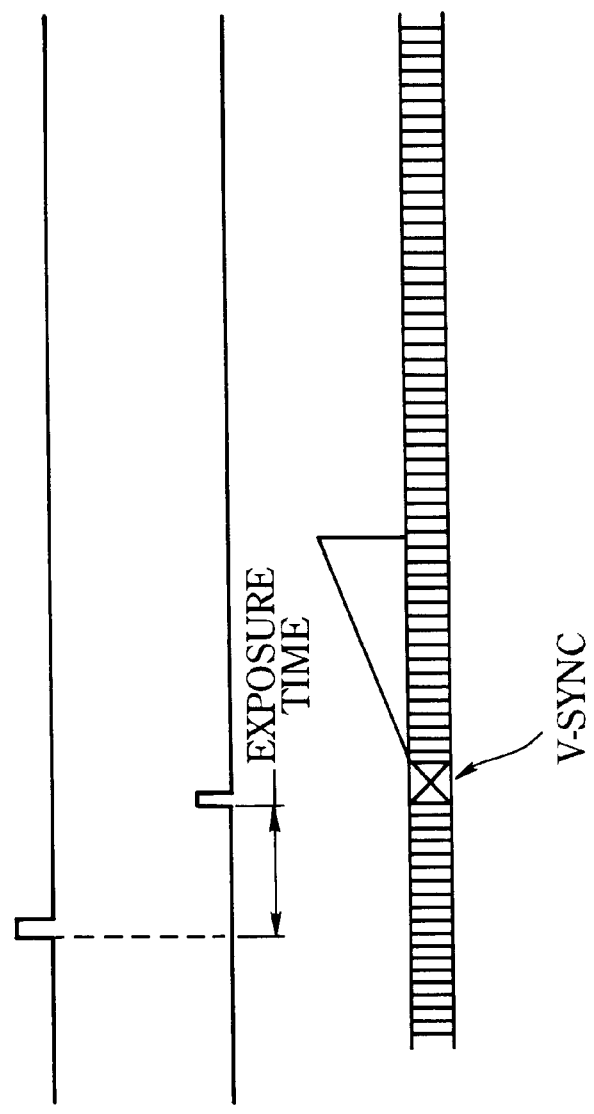

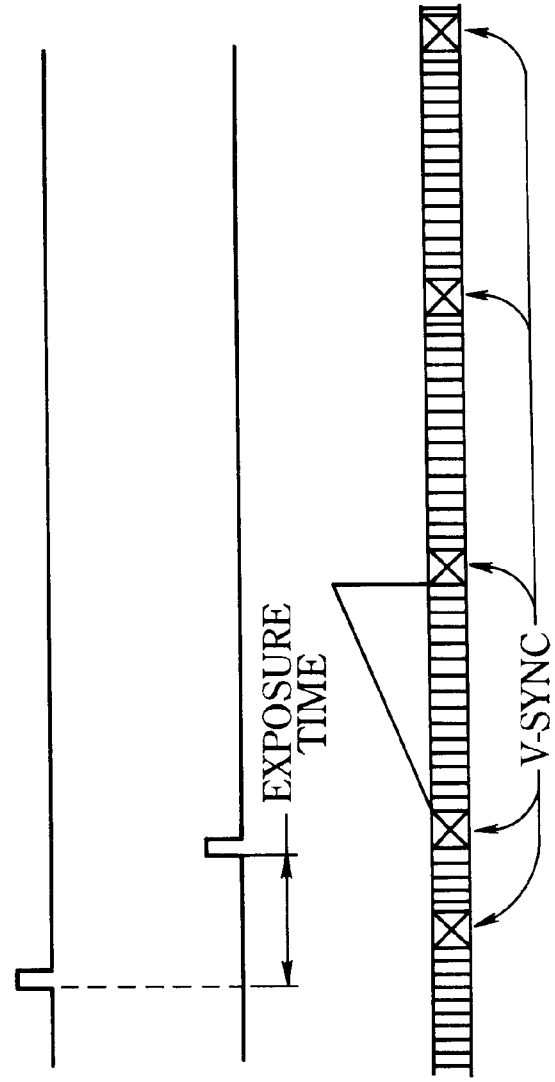
FIG.5(a) PRIOR ART — TRIGGER SIGNAL
FIG.5(b) PRIOR ART — READ-OUT SIGNAL
FIG.5(c) PRIOR ART — VIDEO SIGNAL

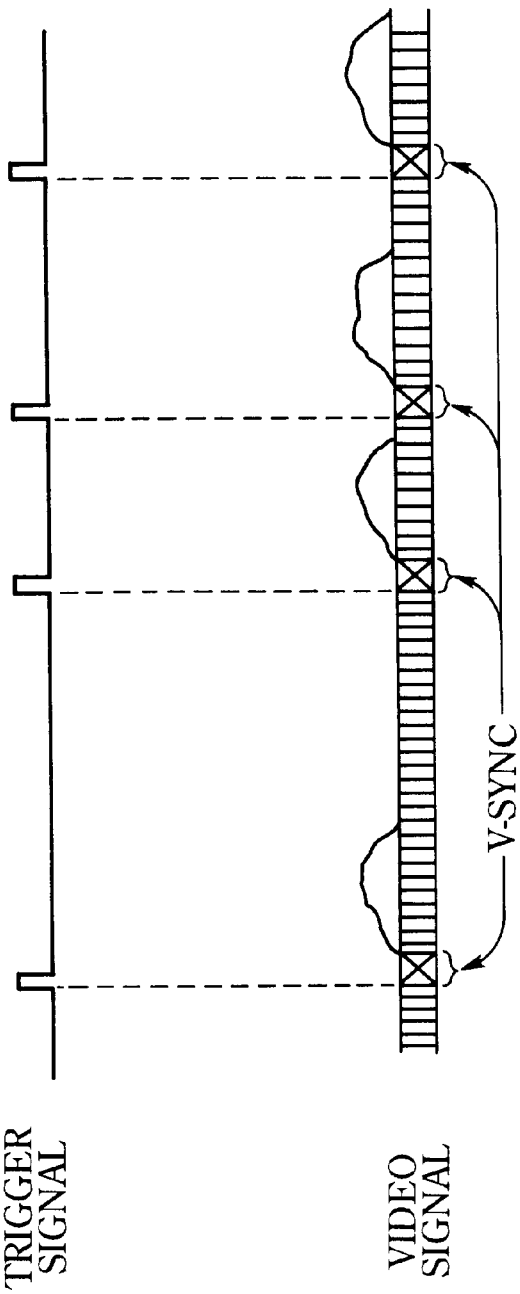

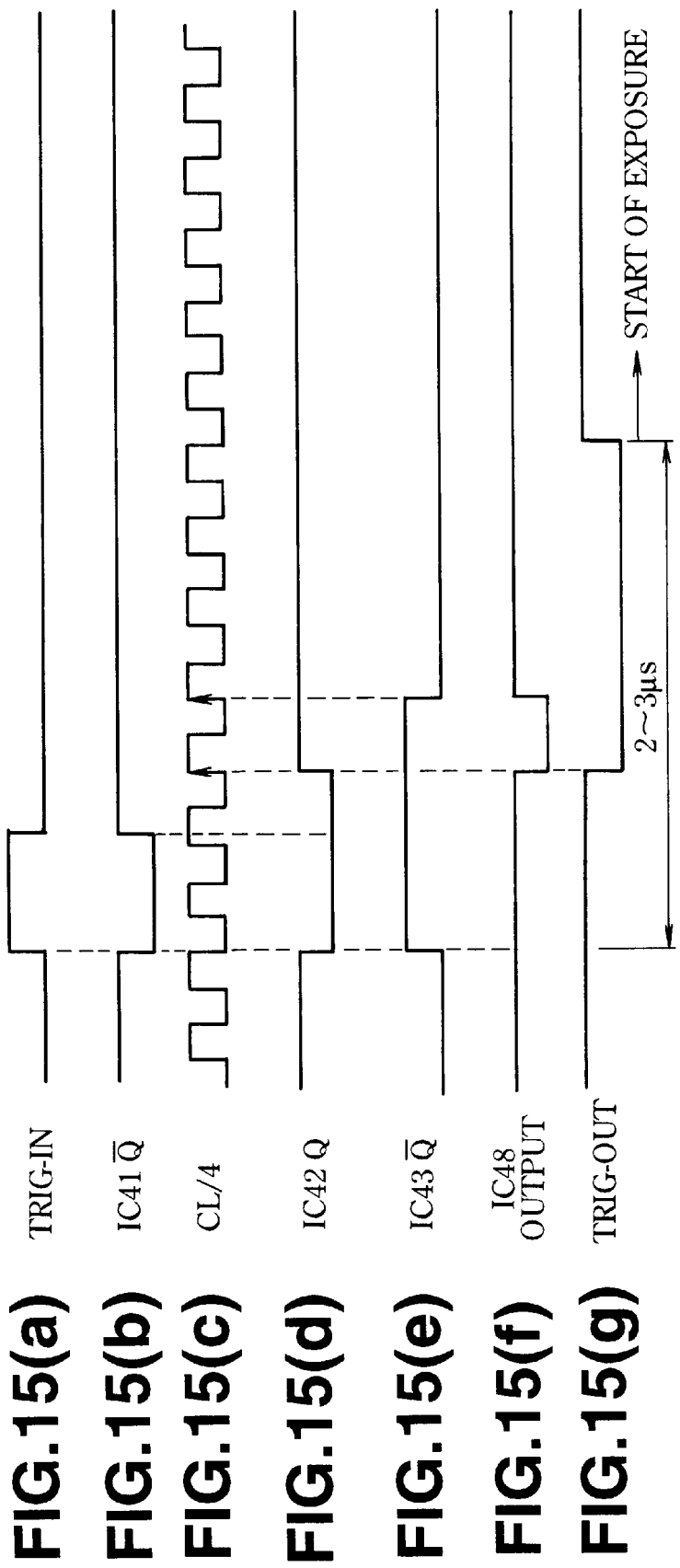

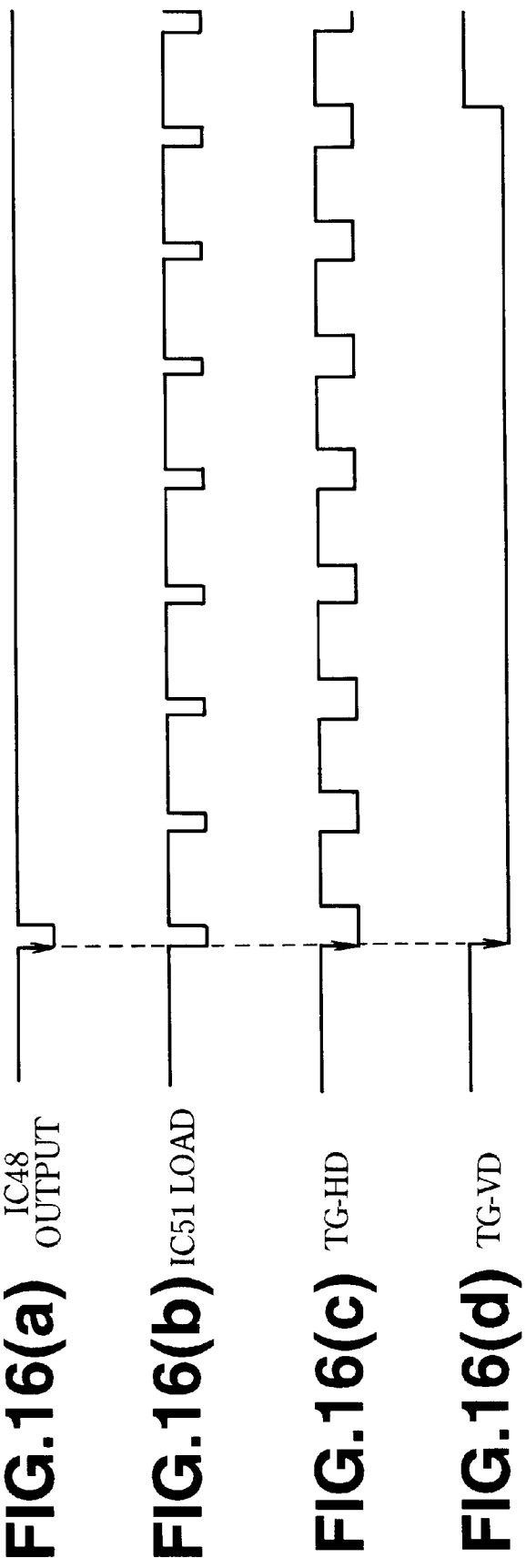

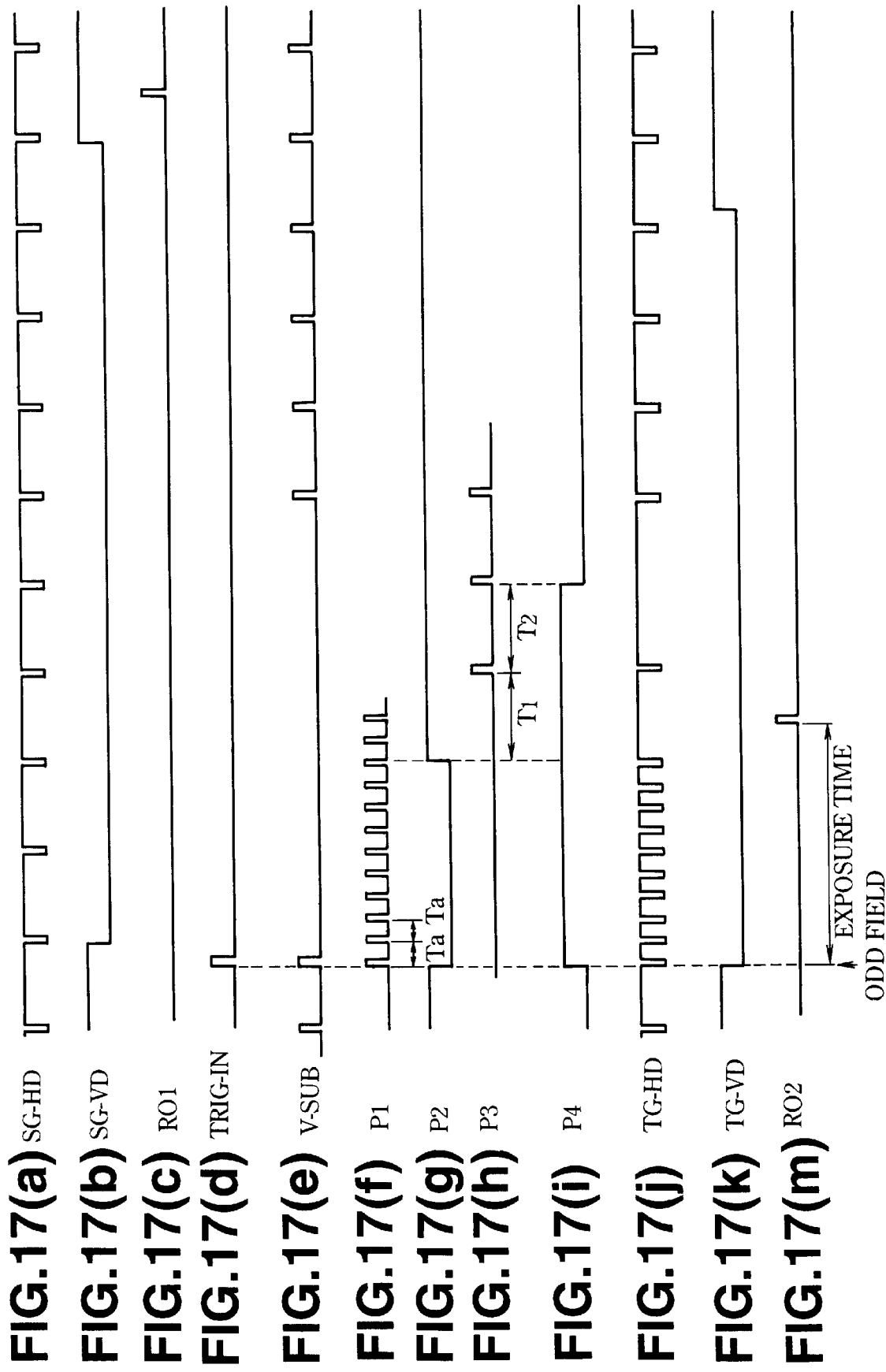

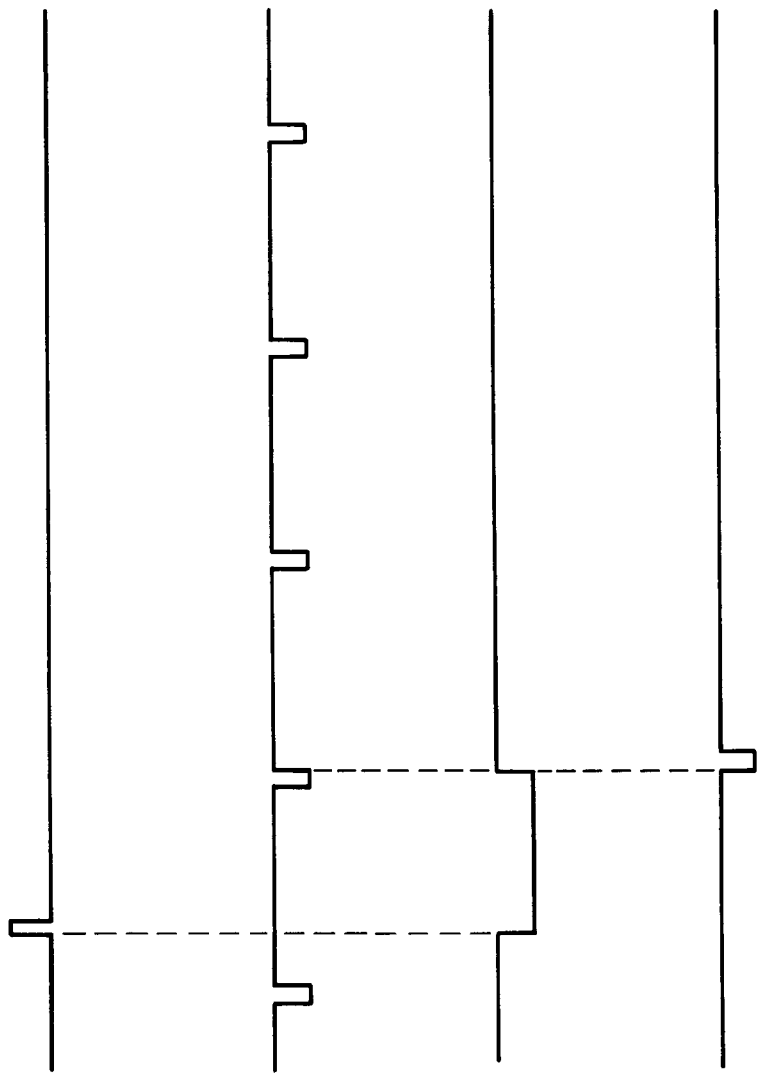

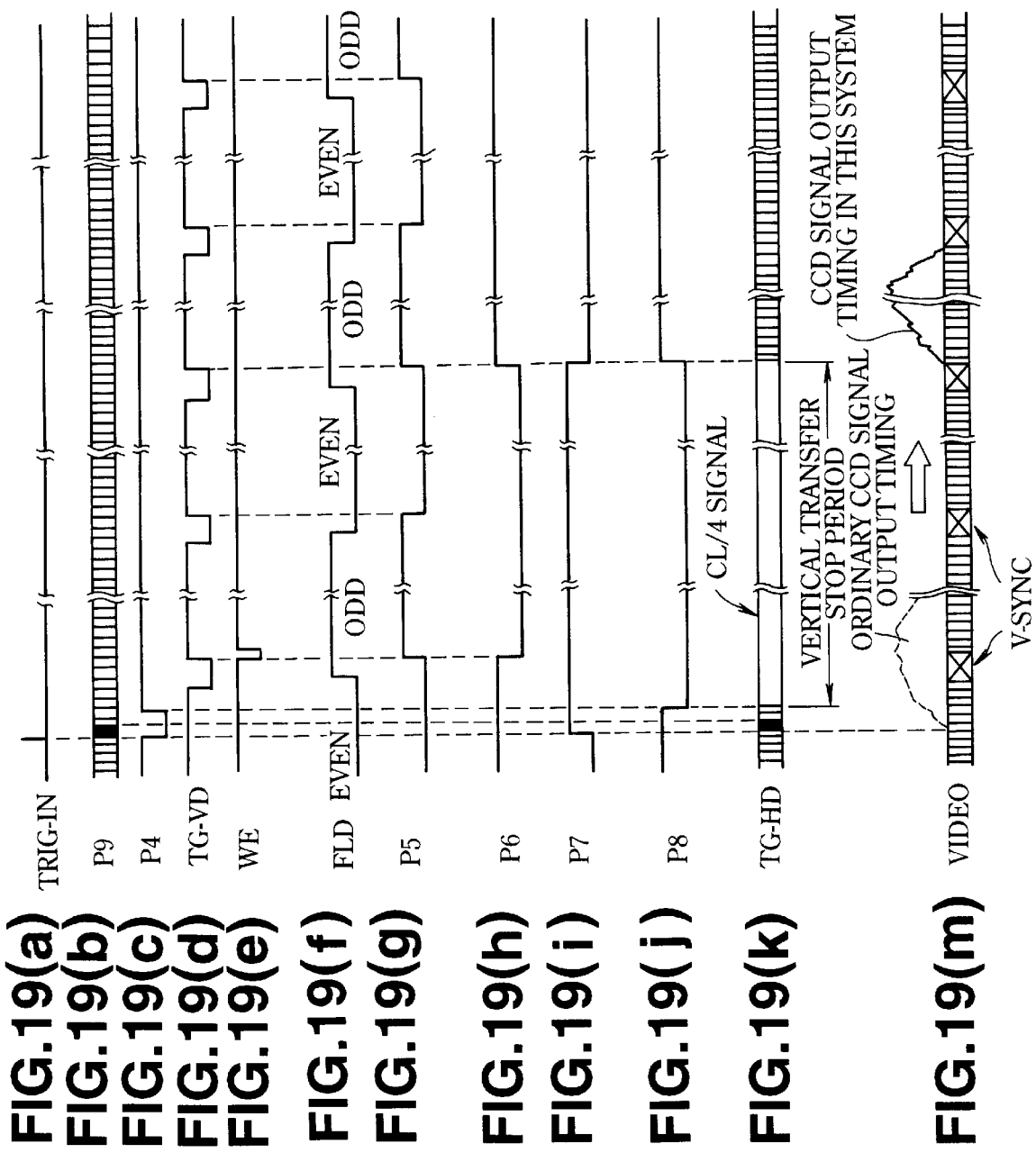

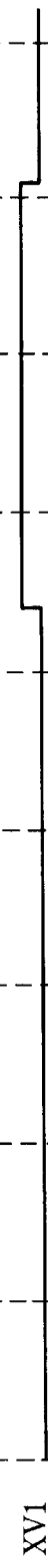
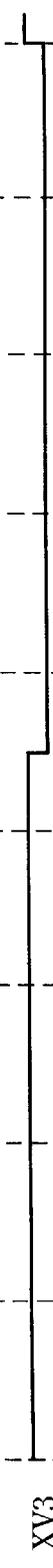
FIG.20(a) SG-HD
FIG.20(b) MCK
FIG.20(c) CL
FIG.20(d) XV1
FIG.20(e) XV2
FIG.20(f) XV3
FIG.20(g) XV4

FIG.21(a) HD 
FIG.21(b) CL/4 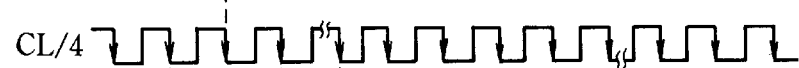
FIG.21(c) XV1 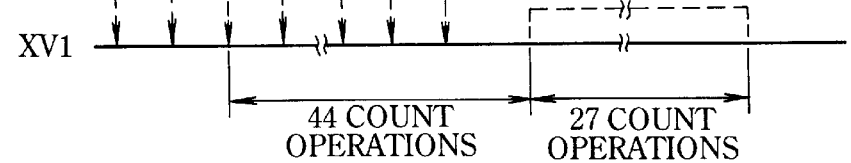
44 COUNT OPERATIONS   27 COUNT OPERATIONS
FIG.22(a) TRIG-IN 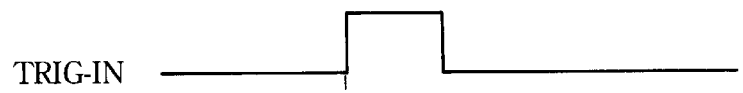
FIG.22(b) WE 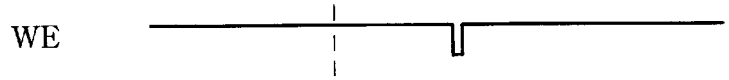
FIG.22(c) FLD  EVEN ODD EVEN ODD EVEN ODD 
FIG.22(d) VIDEO 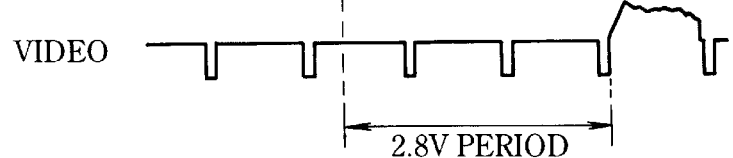
2.8V PERIOD

FIG.23(a) TRIG-IN 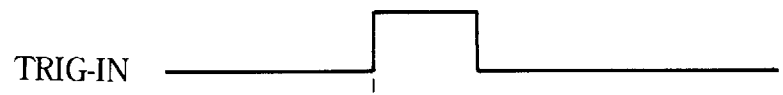
FIG.23(b) WE 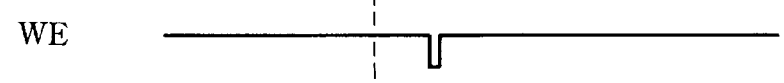
FIG.23(c) FLD 
FIG.23(d) VIDEO 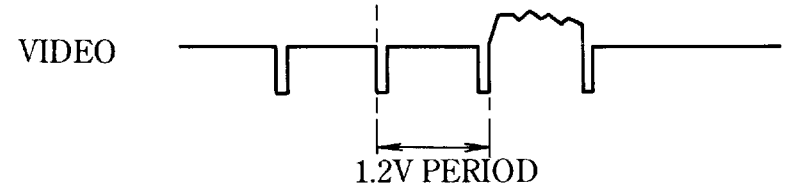
FIG.24
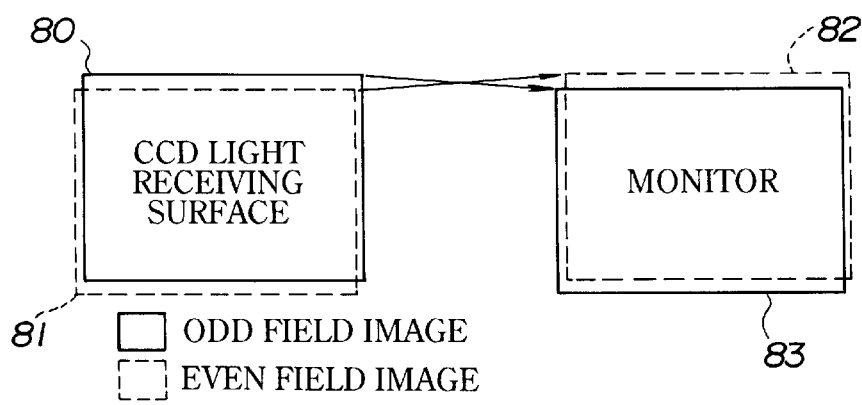

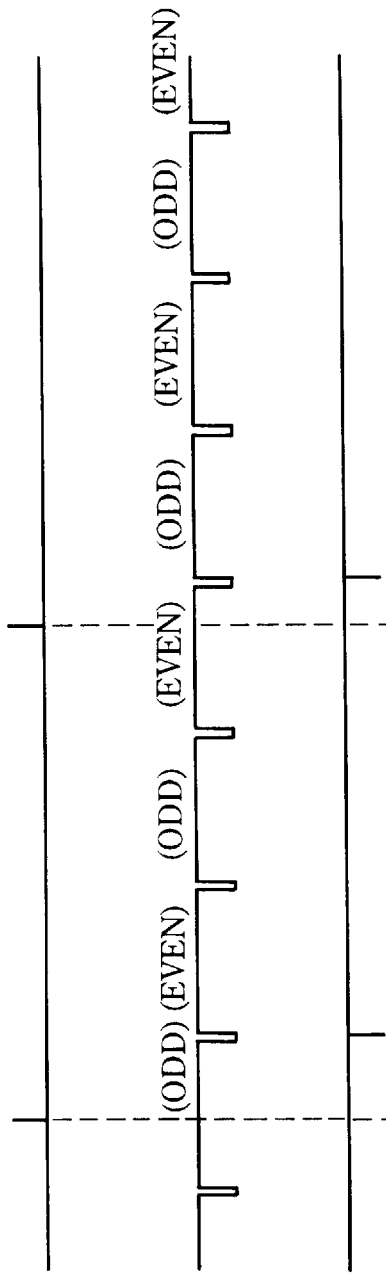
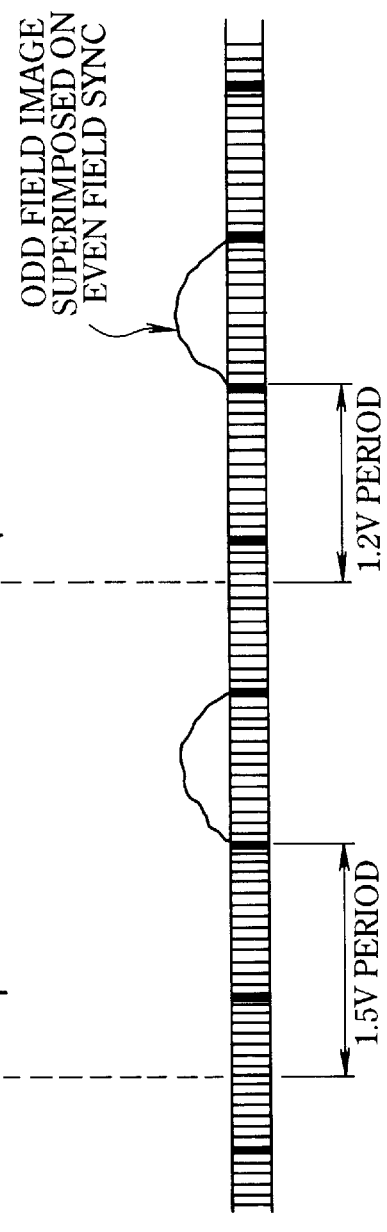
FIG.25(a) TRIG-IN
FIG.25(b) EXT-VD
FIG.25(c) WE
FIG.25(d) VIDEO
ODD FIELD IMAGE SUPERIMPOSED ON EVEN FIELD SYNC
1.2V PERIOD
1.5V PERIOD

IMAGE PICK-UP DEVICE WITH CONTROL CIRCUIT THAT PROVIDES A VARIABLE HORIZONTAL SYNCHRONIZING SIGNAL

TECHNICAL FIELD

This invention relates to an imaging (image picking up) system suitable used in a camera apparatus or the like used as an image pick-up apparatus mainly for Factory Automation (FA) to pick up image of, e.g., an object moving at a high speed.

BACKGROUND ART

One applicant of this application has proposed, in the Japanese Patent Application Laid Open No. 119776/1992, an image pick-up apparatus having an electronic shutter function to carry out exposure time adjustment without use of a mechanical iris by controlling the charge storage time of a solid-state image pick-up device (CCD image sensor) of the Interline Transfer (IT) type.

In this image pick-up apparatus, an approach is employed to read out, to the vertical transfer sections, charges stored in respective pixels of the photoelectric converting section of the CCD image sensor by a read-out signal shown in FIG. 1(b) outputted at the vertical blanking period VBLK during which a vertical blanking signal shown in FIG. 1(a) is caused to be low level. The charge storage time of the CCD image sensor is controlled by a reset signal shown in FIG. 1(c). When this reset signal is delivered, the CCD image sensor sweeps out charges stored in the pixels into the overflow drain.

For this reason, for a time period during which the reset signal is delivered (charge sweep-out period), no charge is stored into the CCD image sensor. Accordingly, effective charges are stored (accumulated) into the photoelectric converting section of the CCD image sensor from the time point when the reset signal delivered to the CCD image sensor is stopped. By controlling the timing at which the reset signal is stopped, it is possible to control the charge storage time, i.e., the shutter speed.

Since the image pick-up apparatus can vary the shutter speed in dependency upon movement (motion) of an object by using such an electronic shutter function, it is advantageous in taking in images particularly in high speed moving object (body).

At present, an image pick-up apparatus used, e.g., mainly for FA and adapted to carry out image pick-up of a moving object is known. This image pick-up apparatus has a configuration as shown in FIG. 2, for example. When an object 201 moving on a movement path 200 moves up to the position in front of an image pick-up section 202, a position detecting section 203 detects this movement of the object to deliver, to a shutter signal generating circuit 204, a trigger signal which falls to low level at time t11 of FIG. 3(a) (i.e., the shutter control signal is caused to be active).

When the trigger signal is delivered, the shutter signal generating circuit 204 delivers, to a CCD control circuit 205, a shutter control signal which rises to high level at the time t11 of FIG. 3(b).

For a time period during which the shutter control signal is not active, the CCD control circuit 205 delivers a reset signal (indicating the state where the shutter control signal is inactive) for sweeping out charges stored in the photoelectric converting section of the CCD image sensor 206 into the overflow drain. Thus, for a time period during which the circuit 206 is supplied with the reset signal, no charge is stored into respective pixels of the photoelectric converting section of the CCD image sensor 206. However, when the trigger signal is delivered, the circuit 205 stops the reset signal (allow the shutter control signal to be active) delivered to the CCD image sensor 206. Thus, storage (accumulation) of effective charges into respective pixels of the photoelectric converting section of the CCD image sensor 206 is started.

More particularly, the CCD control circuit 205 is supplied with a vertical synchronizing signal which represents low level for a time period from time t11 to time t12 of FIG. 3(c) and a horizontal synchronizing signal shown in FIG. 3(d) from a synchronizing signal generating circuit 207. When the shutter control signal of H level (i.e., in active state) is delivered, the CCD control circuit 205 counts, by nine (9), the number of pulses of the horizontal synchronizing signal shown in FIG. 3(d) from the time t11 at which the vertical synchronizing signal shown in FIG. 3(c) falls thereafter to count the number of pulses of a clock signal (hereinafter simply referred to as clock pulses depending upon circumstances) by several hundreds thereafter to deliver a read-out signal indicated at time t13 of FIG. 3(e) to the CCD image sensor 206.

Thus, for a time period from the time when the shutter control signal of H level (i.e., in active state) is delivered to the CCD image sensor 206 at the time t11 of FIG. 3(b) up to the time when the read-out signal is delivered to the CCD image sensor 206 at time t13 of FIG. 3(e), charges corresponding to image pick-up light irradiated through an imaging lens will be stored (accumulated) into the CCD image sensor 206. This time period from the time t11 to the time t13 is the charge storage time.

In the above-mentioned timing chart, FIG. 3(f) indicates the vertical blanking period VBLK.

Charges read out from the CCD image sensor 206 are delivered to a signal processing circuit 209 as an image pick-up signal. The signal processing circuit 209 implements a signal processing to add a synchronizing signal to the image pick-up signal, etc. to output this signal through output terminal 210 as a video signal. The video signal outputted through the output terminal 210 is delivered to, e.g., monitor. Thus, it is possible to analyze the state of the object 201 in the case where the object 201 is moved.

Since such image pick-up apparatus adapted for carrying out image pick-up of a moving object is used mainly for FA, there are instances where the object 201 shown in FIG. 2 is moved at a high speed to carry out imaging (image pick-up) operation by high speed shutter, e.g., 1/10000 sec., etc.

However, the above-mentioned image pick-up apparatus counts, e.g., by nine (9), the number of pulses of the horizontal synchronizing signal, from falling of the vertical synchronizing signal thereafter to deliver, to the CCD image sensor, a read-out signal at the timing where clock pulses are counted by several hundreds. Namely, the output timing of the read-out signal is fixedly set in advance on the basis of pixel arrangement of the CCD image sensor.

Accordingly, the charge storage time of the image pick-up apparatus could not be shortened so that it is equal to a time less than the time from the falling time of the vertical synchronizing signal up to the time when the read-out signal is outputted. For this reason, the conventional image pick-up apparatus could not carry out image pick-up operation by high speed shutter such as 1/10000 sec., etc.

The above-mentioned image pick-up apparatus is adapted to start storage (accumulation) of effective charges in accordance with a trigger signal delivered from the position detecting section 203 as described above. Namely, this image pick-up apparatus operates in accordance with the timing of the trigger signal delivered from the position detecting section 203.

Meanwhile, there are instances where there is a need such that an image processing equipment is used to implement image processing to a video signal from the image pick-up apparatus. Generally, the image processing equipment operates with a predetermined synchronizing signal being as reference. For this reason, e.g., in the case where video signals from a plurality of image pick-up apparatuses or video recording/reproducing apparatuses, etc. are synthesized, or the like, it is necessary to deliver a video signal synchronous with a synchronizing signal serving as reference to an image processing equipment.

In more practical sense, when a trigger signal is delivered, as shown in FIG. 4(*a*), for example, at an arbitrary timing, this image pick-up apparatus delivers the read-out signal shown in FIG. 4(*b*) to the CCD image sensor after a predetermined charge storage time, i.e., exposure time to read out charges stored in respective pixels of the photoelectric converting section to the vertical transfer sections, and to generate a vertical synchronizing signal V-SYNC simultaneously therewith to output, as an image pick-up signal, through the horizontal transfer section, the charges which have been read out to the vertical transfer sections at a timing synchronized with the generated vertical synchronizing signal V-SYNC.

Namely, this image pick-up apparatus attempts to generate vertical synchronizing signals V-SYNC of a fixed period after the trigger signal is delivered, as shown in FIG. 5(*c*), for example, wherein when a trigger signal shown in FIG. 5(*a*) is delivered, a read-out signal shown in FIG. 5(*b*) is delivered to the CCD image sensor after a predetermined exposure time to read out, to the vertical transfer sections, charges stored in respective pixels of the photoelectric converting section, and to generate a vertical synchronizing signal V-SYNC simultaneously therewith.

In this image pick-up apparatus, however since video signals are outputted as shown in FIG. 6(*b*) at random time intervals in accordance with trigger signals delivered at arbitrary timings, i.e., at random as shown in FIG. 6(*a*), it is impossible to output the vertical synchronizing signals V-SYNC at a fixed period in practice.

Meanwhile, in video processing equipments, e.g., frame memory, monitor or the like for carrying out processing by using video signals from such an image pick-up apparatus, their operations are required to be synchronized with video signals delivered thereto.

However, in such video processing equipments, it is very difficult from a technical point of view to synchronize their operations with synchronizing signals of random period. Such a way of synchronization is not carried out in general.

An object of this invention is to provide an image pick-up apparatus capable of effecting high speed shutter operation.

Another object of this invention is to provide an image pick-up apparatus capable of controlling the timing at which a video signal obtained by imaging is outputted, and easy to take synchronization with external equipments.

A further object of this invention is to provide an imaging (image picking up) system capable of outputting video signals from an image pick-up apparatus (unit) in a manner synchronized with a synchronizing signal from an image taking-in unit.

A still further object of this invention is to provide a control unit and a control system which are adapted to output video signals from an image pick-up apparatus in a manner synchronized with a synchronizing signal from an image taking-in unit.

SUMMARY OF THE INVENTION

An image pick-up apparatus according to this invention comprises: an interline transfer type solid-state image pick-up device including a light receiving section for producing charges corresponding to quantity of light incident thereto, a vertical transfer section to which the charges produced in the light receiving section are transferred, a horizontal transfer section for outputting the charges transferred through the vertical transfer section, and a charge sweep-out section, and having an electronic shutter function to sweep out the charges stored in the light receiving section into the charge sweep-out section in accordance with an electronic shutter control signal; electronic shutter signal generating means supplied with a trigger signal to generate the shutter control signal; read-out signal generating means for generating a read-out signal for reading out the charges stored in the light receiving section to the vertical transfer section as effective charges after a predetermined time is passed from the time point when the trigger signal is delivered; charge transfer stopping means for stopping vertical transfer of charges in the vertical transfer section at least up to a timing at which the read-out signal is generated after the trigger signal is delivered; and charge transfer starting means operative to release stop of the vertical transfer of the effective charges in the vertical transfer section by the charge stopping means at a timing based on an external synchronizing signal to start the vertical transfer of the effective charges so that the effective charges are output through the horizontal transfer section.

Moreover, in the image pick-up apparatus according to this invention, the charge transfer starting means releases stop of vertical transfer of the effective charges in the vertical transfer section at a timing where a field discrimination signal included in the external synchronizing signal indicates start of one of the odd field and the even field so as to start the vertical transfer of the effective charges.

Further, the image pick-up apparatus according to this invention further comprises output request signal generating means for generating an output request signal at a predetermined timing based on the external synchronizing signal after the trigger signal is delivered, whereby the charge transfer starting means releases stop of vertical transfer of the effective charges at the vertical transfer section at a timing where a field discrimination signal included in the external synchronizing signal indicates start of one of the odd field and the even field after the output request signal is delivered so as to start the vertical transfer of the effective charges.

Further, the image pick-up apparatus according to this invention further comprises output request signal generating means for generating an output request signal at a predetermined timing based on the external synchronizing signal after the trigger signal is delivered, whereby the charge transfer starting means releases stop of vertical transfer of the effective charges in the vertical transfer section at a timing where the external synchronizing signal indicates start of a field existing at the beginning after the output request signal is delivered so as to start the vertical transfer of the effective charges.

An image pick-up apparatus according to this invention comprises: an interline transfer type solid-state image pick-up device including a light receiving section for producing charges corresponding to quantity of light incident thereto, a vertical transfer section to which charges produced in the light receiving section are transferred, a horizontal transfer section for outputting the charges transferred through the vertical transfer section, and a charge sweep-out section, and having an electronic shutter function to sweep out the charges stored in the light receiving section into the charge sweep-out section in accordance with an electronic shutter control signal; a first synchronizing signal input terminal supplied with a first vertical synchronizing signal and a first horizontal synchronizing signal, internal synchronizing signal generating means for generating an internal vertical synchronizing signal and an internal horizontal synchronizing signal on the basis of the first vertical synchronizing signal and the first horizontal synchronizing signal; a second synchronizing signal input terminal supplied with a second vertical synchronizing signal and a second horizontal synchronizing signal; drive signal generating means for generating, on the basis of the second vertical synchronizing signal and the second horizontal synchronizing signal, a read-out signal for transferring the charges stored in the light receiving section to the vertical transfer section and a vertical transfer signal for vertically transferring the charges which have been read out to the vertical transfer section; a trigger signal input terminal supplied, from the external, with a trigger signal for designating image pick-up of an object; electronic shutter signal generating means for generating the electronic shutter control signal when the trigger signal is supplied; video signal generating means for carrying out signal processing, at a timing based on the internal synchronizing signal, with respect to a signal based on the charges which have been read out from the horizontal transfer section of the solid-state image pick-up device to generate a video signal; and a video signal output terminal for outputting the video signal generated at the video signal generating means.

An image pick-up apparatus according to this invention comprises: an interline transfer type solid-state image pick-up device including a light receiving section for producing charges corresponding to quantity of light incident thereto, a vertical transfer section to which the charges produced in the light receiving section are transferred, a horizontal transfer section for outputting the charges transferred through the vertical transfer section, and a charge sweep-out section, and having an electronic shutter function to sweep out the charges stored in the light receiving section into the charge sweep-out section in accordance with an electronic shutter control signal; an external synchronizing signal input terminal supplied with an external vertical synchronizing signal and an external horizontal synchronizing signal; internal synchronizing signal generating means for generating an internal vertical synchronizing signal and an internal horizontal synchronizing signal on the basis of the external vertical synchronizing signal and the external horizontal synchronizing signal; modulated synchronizing signal generating means responsive to a timing based on the internal horizontal synchronizing signal to generate a modulated horizontal synchronizing signal having a frequency higher than that of the internal horizontal synchronizing signal, and to generate an output vertical synchronizing signal based on the internal vertical synchronizing signal; selector means for selectively outputting the internal vertical synchronizing signal and the internal horizontal synchronizing signal, or the output vertical synchronizing signal and the modulated horizontal synchronizing signal; drive signal generating means for generating a read-out signal for transferring the charges stored in the light receiving section to the vertical transfer section and a vertical transfer signal for vertically transferring charges which have been read out to the vertical transfer section on the basis of the internal vertical synchronizing signal and the internal horizontal synchronizing signal, or the output vertical synchronizing signal and the modulated horizontal synchronizing signal which have been selectively outputted through the selector means; a trigger signal input terminal supplied, from the external, with a trigger signal for designating image pick-up of an object; electronic shutter signal generating means for generating the electronic shutter control signal when the trigger signal is supplied; video signal generating means for carrying out signal processing, at a timing based on the internal synchronizing signal, with respect to a signal based on the charges which have been read out from the horizontal transfer section of the solid-state image pick-up device to generate a video signal; and a video signal output terminal for outputting the video signal generated at the video signal generating means.

An image pick-up apparatus according to this invention comprises: an interline transfer type solid-state image pick-up device including a light receiving section for producing charges corresponding to quantity of light incident thereto, a vertical transfer section to which the charges produced in the light receiving section are transferred, a horizontal transfer section for outputting the charges transferred through the vertical transfer section, and a charge sweep-out section, and having an electronic shutter function to sweep out the charges stored in the light receiving section into the charge sweep-out section in accordance with an electronic shutter control signal; a first synchronizing signal input terminal supplied with a first vertical synchronizing signal and a first horizontal synchronizing signal, internal synchronizing signal generating means for generating an internal vertical synchronizing signal and an internal horizontal synchronizing signal on the basis of the first vertical synchronizing signal and the first horizontal synchronizing signal; a second synchronizing signal input terminal supplied with a second vertical synchronizing signal and a second horizontal synchronizing signal; selector means for selectively outputting the first vertical synchronizing signal and the first horizontal synchronizing signal, or the second vertical synchronizing signal and the second horizontal synchronizing signal; drive signal generating means for generating, on the basis of the first vertical synchronizing signal and the first horizontal synchronizing signal, or the second vertical synchronizing signal and the second horizontal synchronizing signal which have been selectively outputted through the selector means, a read-out signal for transferring the charges stored in the light receiving section to the vertical transfer section and a vertical transfer signal for vertically transferring the charges which have been read out to the vertical transfer section; a trigger signal input terminal supplied, from the external, with a trigger signal for designating image pick-up of an object; electronic shutter signal generating means for generating the electronic shutter control signal when the trigger signal is supplied; video signal generating means for carrying out signal processing, at a timing based on the internal synchronizing signal, with respect to a signal based on the charges which have been read out from the horizontal transfer section of the solid-state image pick-up device to generate a video signal; and a video signal output terminal for outputting the video signal generated at the video signal generating means.

An imaging system according to this invention comprises: an interline transfer type solid-state image pick-up device including a light receiving section for producing charges corresponding to quantity of light incident thereto, a vertical transfer section to which the charges produced in the light receiving section are transferred, a horizontal transfer section for outputting the charges transferred through the vertical transfer section, and a charge sweep-out section, and having an electronic shutter function to sweep out the charges stored in the light receiving section into the charge sweep-out section in accordance with an electronic shutter control signal; external synchronizing signal generating means for generating an external vertical synchronizing signal and an external horizontal synchronizing signal; a trigger signal input terminal supplied, from the external, a trigger signal for designating image pick-up of an object; modulated synchronizing signal generating means for generating a modulated horizontal synchronizing signal having a frequency higher than that of the external horizontal synchronizing signal for a time period from a timing after a predetermined time is passed from the time when the trigger signal is delivered to the trigger signal input terminal up to a timing based on the external vertical synchronizing signal, and for generating an output vertical synchronizing signal based on the external vertical synchronizing signal; electronic shutter signal generating means for generating an electronic shutter control signal for sweeping out the charges stored in the light receiving section into the charge sweep-out section when the trigger signal is supplied; read-out signal generating means for generating a read-out signal for transferring the charges stored in the light receiving section to the vertical transfer section when a predetermined time is passed from the time when the trigger signal is delivered thereto; vertical transfer signal generating means for generating a vertical transfer signal for vertically transferring the charges which have been transferred to the vertical transfer section when the modulated horizontal synchronizing signal does not take a high frequency; and memory means for storing a video signal based on the charges outputted from the solid-state image pick-up device at a timing based on the external vertical synchronizing signal.

In the imaging system according to this invention, the modulated synchronizing signal generating means generates a signal having a frequency higher than that of the external horizontal synchronizing signal as the modulated horizontal synchronizing signal for a time period from a timing when a predetermined time is passed from the time when the trigger signal is delivered up to a timing at which a field discrimination signal included in the external vertical synchronizing signal indicates start of one of the odd field and the even field.

The imaging system according to this invention further comprises output request signal generating means for generating an output request signal at a predetermined timing based on the external vertical synchronizing signal after the trigger signal is delivered, whereby the modulated horizontal synchronizing signal generating means generates a signal having a frequency higher than that of the external horizontal synchronizing signal as the modulated horizontal synchronizing signal for a time period from a timing when a predetermined time is passed from the time when the trigger signal is delivered up to a timing at which the output request signal is delivered and a field discrimination signal included in the external vertical synchronizing signal indicates start of one of the odd field and the even field.

The imaging system according to this invention further comprises output request signal generating means for generating an output request signal at a predetermined timing based on the external vertical synchronizing signal after the trigger signal is delivered, whereby the modulated horizontal synchronizing signal generating means generates a signal having a frequency higher than that of the external horizontal synchronizing signal as the modulated horizontal synchronizing signal for a time period from a timing when a predetermined time is passed from the time when the trigger signal is delivered up to a timing at which the output request signal is delivered and the external vertical synchronizing signal indicates start of field existing at the beginning.

This invention is directed to a control apparatus for controlling operation timings of an image pick-up apparatus having an interline transfer type solid-state image pick-up device including a light receiving section for producing charges corresponding to quantity of light incident thereto, a vertical transfer section to which charges the produced in the light receiving section are transferred, a horizontal transfer section for outputting the charges transferred through the vertical transfer section, and a charge sweep-out section, and having an electronic shutter function to sweep out the charges stored in the light receiving section into the charge sweep-out section in accordance with an electronic shutter control signal, the control apparatus comprising: an external synchronizing signal input terminal supplied with an external vertical synchronizing signal and an external horizontal synchronizing signal; a trigger signal input terminal supplied, from the external, with a trigger signal for designating image pick-up of an object; a trigger signal output terminal for outputting, to the image pick-up apparatus, an output trigger signal based on the trigger signal delivered to the trigger signal input terminal; modulated synchronizing signal generating means responsive to a timing based on the external vertical synchronizing signal delivered to the external synchronizing signal input terminal to generate a modulated horizontal synchronizing signal having a frequency higher than that of the external horizontal synchronizing signal, and to generate an output vertical synchronizing signal based on the external vertical synchronizing signal; and a modulated synchronizing signal output terminal for outputting the modulated horizontal synchronizing signal and the output vertical synchronizing signal to the image pick-up apparatus.

In the control apparatus for image pick-up apparatus according to this invention, the modulated synchronizing signal generating means generates a signal having a frequency higher than that of the external horizontal synchronizing signal as the modulated horizontal synchronizing signal for a time period from a timing when a predetermined time is passed from the time point when the trigger signal is delivered to the trigger input terminal up to a timing at which a field discrimination signal included in the external vertical synchronizing signal indicates start of one of the odd field and the even field.

The control apparatus for image pick-up apparatus according to this invention further comprises output request signal generating means for generating an output request signal at a predetermined timing based on the external vertical synchronizing signal after the trigger signal is delivered, whereby the modulated horizontal synchronizing signal generating means generates a signal having a frequency higher than that of the external horizontal synchronizing signal as the modulated horizontal synchronizing signal for a time period from a timing when a predetermined time is passed from the time when the trigger signal is delivered up to a timing at which the output request signal is delivered and a field discrimination signal included in the external vertical synchronizing signal indicates start of one of the odd field and the even field.

The control apparatus for image pick-up apparatus according to this invention further comprises output request signal generating means for generating an output request signal at a predetermined timing based on the external vertical synchronizing signal after the trigger signal is delivered, whereby the modulated horizontal synchronizing signal generating means generates a signal having a frequency higher than that of the external horizontal synchronizing signal as the modulated horizontal synchronizing signal for a time period from a timing when a predetermined time is passed from the time when the trigger signal is delivered up to a timing at which the output request signal is delivered and the external vertical synchronizing signal indicates start of field existing at the beginning.

This invention is directed to a control system for controlling operation timings of an image pick-up apparatus having an interline transfer type solid state image pick-up device including a light receiving section for producing charges corresponding to quantity of light incident thereto, a vertical transfer section to which the charges produced in the light receiving section are transferred, a horizontal transfer section for outputting the charges transferred through the vertical transfer section, and a charge sweep-out section, and having an electronic shutter function to sweep out the charges stored in the light receiving section in accordance with an electronic shutter control signal, the control system comprising: external synchronizing signal generating means for generating an external vertical synchronizing signal and an external horizontal synchronizing signal; a trigger signal input terminal supplied, from the external, with a trigger signal for designating image pick-up of an object; modulated synchronizing signal generating means responsive to a timing to the external vertical synchronizing signal to generate a modulated horizontal synchronizing signal having a frequency higher than that of the external horizontal synchronizing signal, and to generate an output vertical synchronizing signal based on the external vertical synchronizing signal; a modulated synchronizing signal output terminal for outputting the modulated horizontal synchronizing signal and the output vertical synchronizing signal to the image pick-up apparatus, a video signal input terminal supplied with a video signal outputted from the image pick-up apparatus; and memory means for storing the video signal supplied to the video signal input terminal at a timing based on the external vertical synchronizing signal.

In the control system for image pick-up apparatus according to this invention, the modulated synchronizing signal generating means generates a signal having a frequency higher than that of the external horizontal synchronizing signal as the modulated horizontal synchronizing signal for a time period from a timing when a predetermined time is passed from the time when the trigger signal is delivered up to a timing at which a field discrimination signal included in the external vertical synchronizing signal indicates start of one of the odd field and the even field.

The control system for image pick-up apparatus according to this invention further comprises output request signal generating means for generating an output request signal at a predetermined timing based on the external vertical synchronizing signal after the trigger signal is delivered, whereby the modulated horizontal synchronizing signal generating means generates a signal having a frequency higher than that of the external horizontal synchronizing signal as the modulated horizontal synchronizing signal for a time period from a timing when a predetermined time is passed from the time point when the trigger signal is delivered up to a timing at which the output request signal is delivered and a first discrimination signal included in the external vertical synchronizing signal indicates start of one of the odd field and the even field.

In addition, the control system for image pick-up apparatus according to this invention further comprises output request signal generating means for generating an output request signal at a predetermined timing based on the external vertical synchronizing signal after the trigger signal is delivered, whereby the modulated horizontal synchronizing signal generating means generates a signal having a frequency higher than that of the external horizontal synchronizing signal as the modulated horizontal synchronizing signal for a time period from a timing when a predetermined time is passed from the time when the trigger signal is delivered up to a timing at which the output request signal is delivered and the external vertical synchronizing signal indicates start of field existing at the beginning.

BRIEF DESCRIPTION OF THE DRAWINGS

FIG. 4 is a timing chart showing the operation of the conventional image pick-up apparatus.

FIG. 5 is a timing chart showing the operation of the conventional image pick-up apparatus.

FIG. 6 is a timing chart showing the operation of the conventional image pick-up apparatus.

FIG. 15 is a timing chart for explaining the operation of the modulated HD signal preparation section constituting the control unit.

FIG. 16 is a timing chart for explaining the operation of the modulated HD signal preparation section.

FIG. 17 is a timing chart for explaining the operation of the control unit.

FIG. 18 is a timing chart for explaining the operation of write enable signal preparation section of the image taking-in unit.

FIG. 19 is a timing chart for explaining the operation of the imaging system.

FIG. 20 is a timing chart for explaining the operation of the timing generator of the CCD camera.

FIG. 21 is a timing chart for explaining the operation of the timing generator of the CCD camera.

FIG. 22 is a timing chart for explaining the operation of the imaging system.

FIG. 23 is a timing chart for explaining the operation of the imaging system.

FIG. 24 is a view for explaining positional shift of reproduction image in the imaging system.

FIG. 25 is a timing chart for explaining the operation of the imaging system.

BEST MODE FOR CARRYING OUT THE INVENTION

Preferred embodiments of this invention will now be described in detail with reference to the attached drawings.

Figures 1A, 1B, 1C:
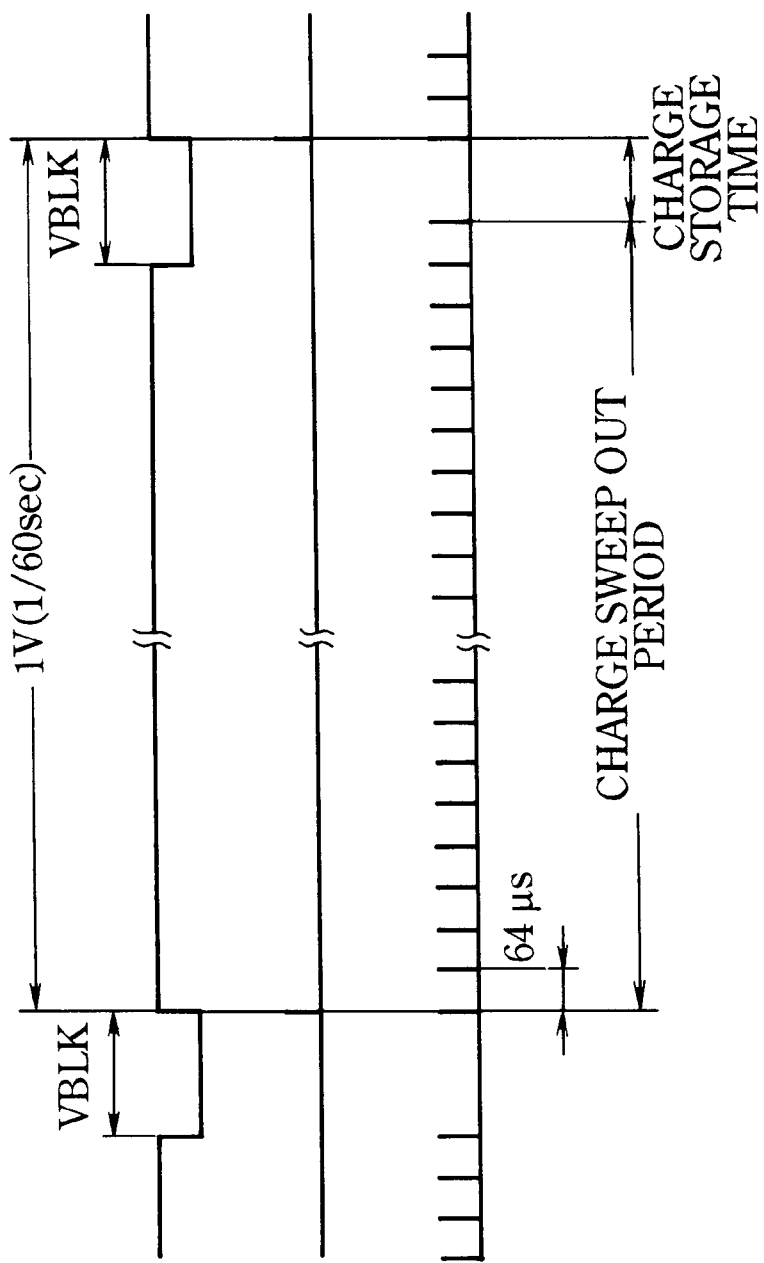
FIG. 1 is a timing chart showing the operation of a conventional image pick-up apparatus.
Figure 2:
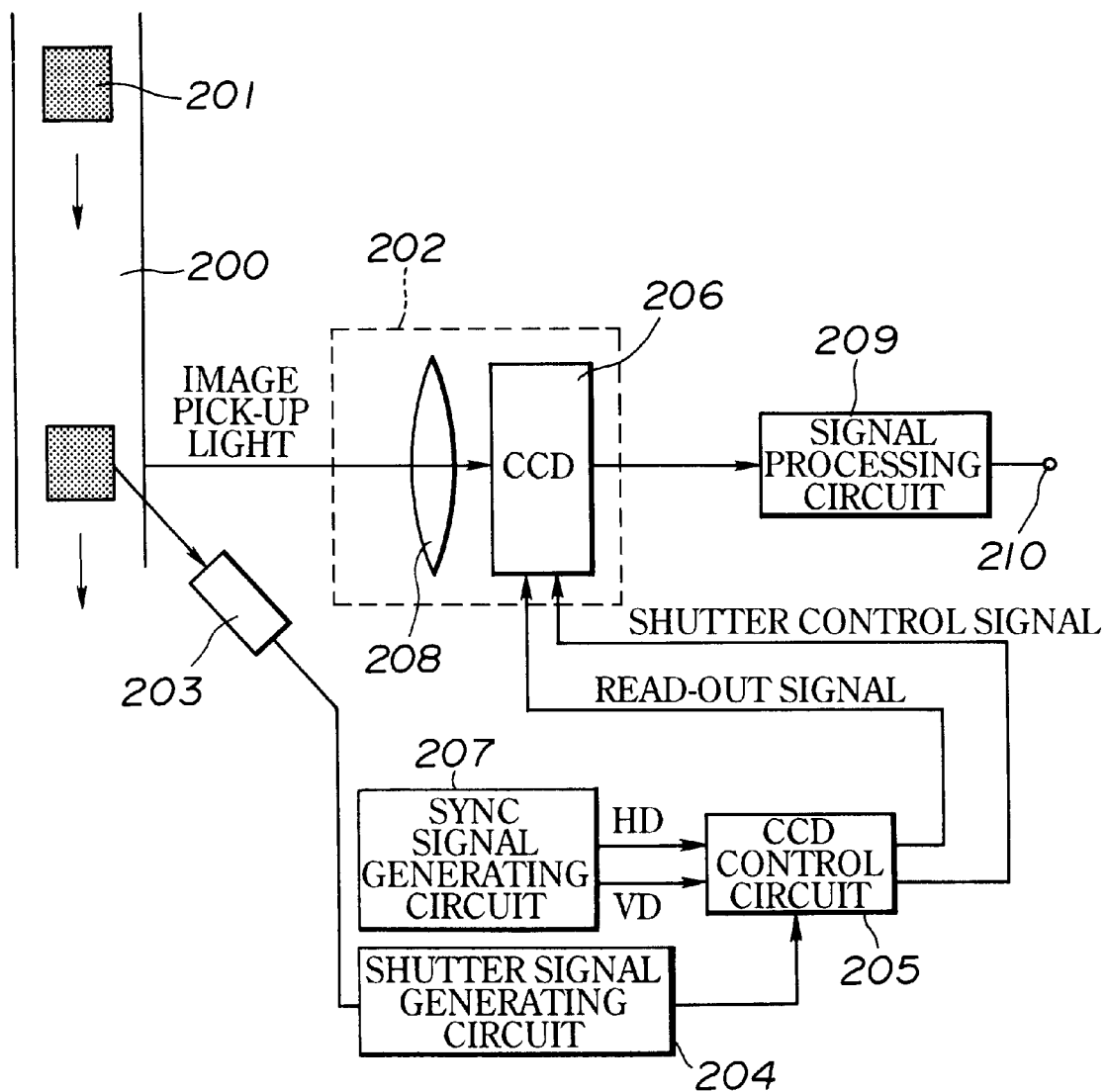
FIG. 2 is a block diagram showing the configuration of the conventional image pick-up apparatus.
Figures 3A, 3B, 3C, 3D, 3E, 3F:
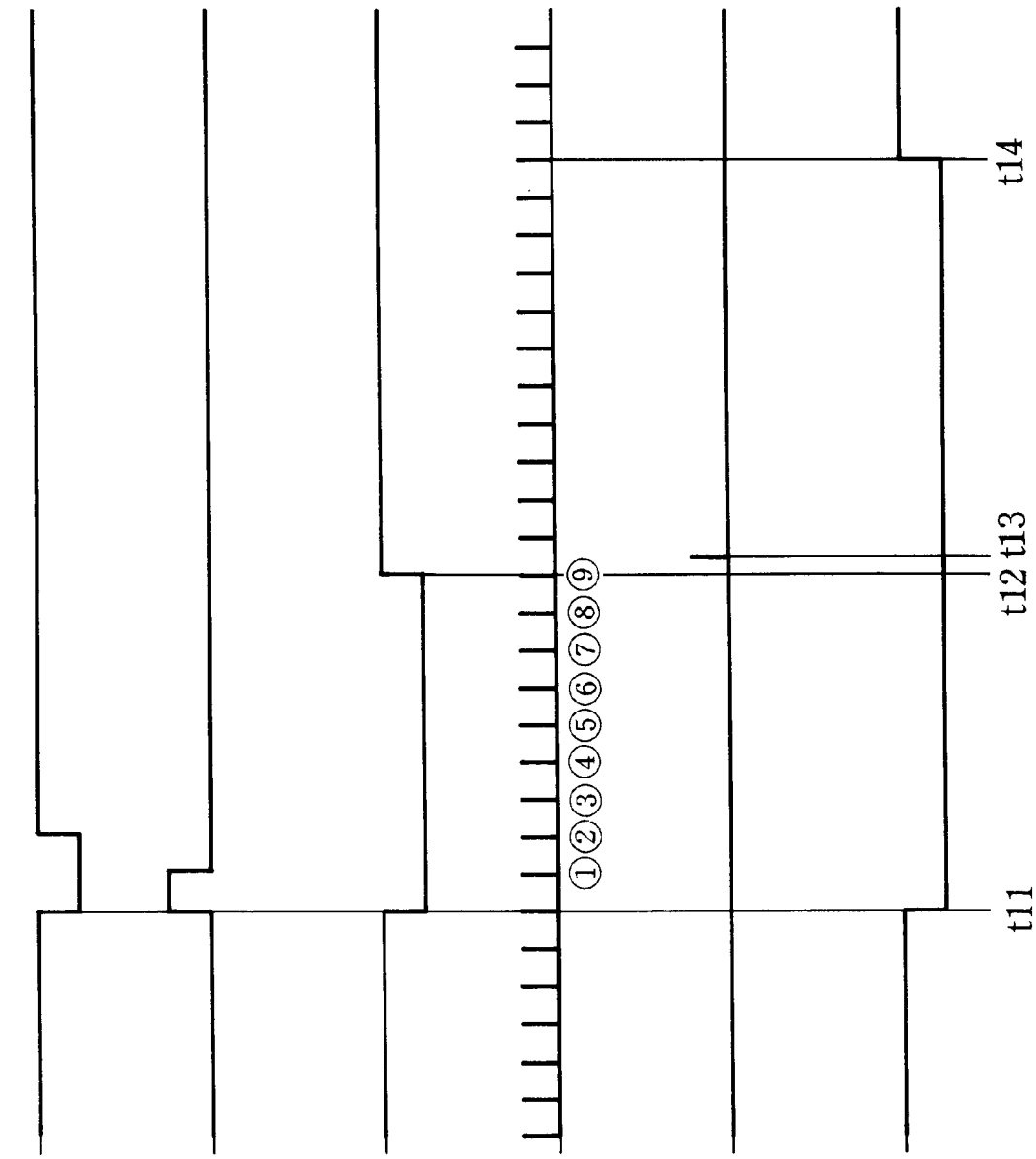
FIG. 3 is a timing chart showing the operation of the conventional image pick-up apparatus.
Figure 7:
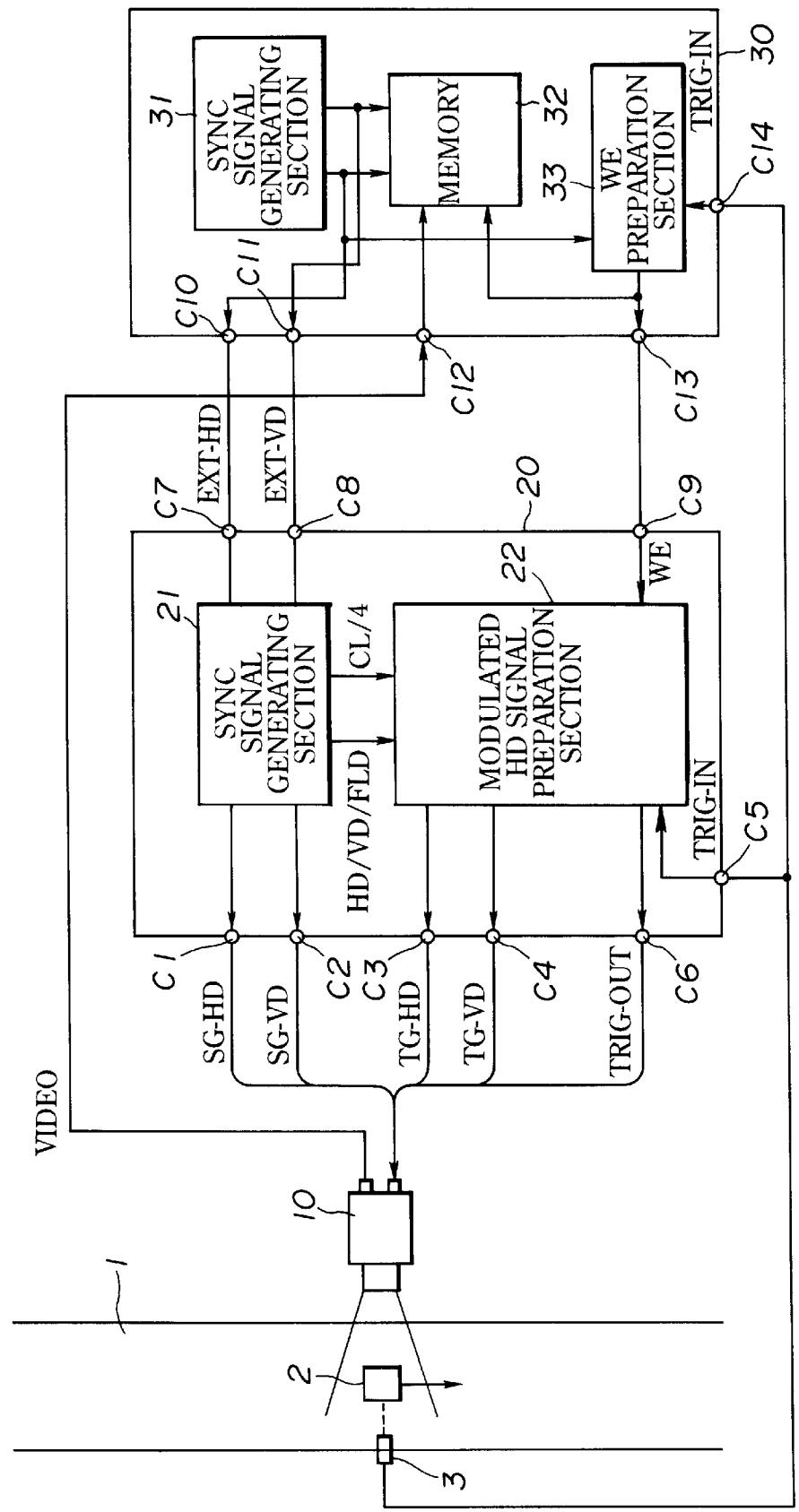
FIG. 7 is a block diagram showing the configuration of an imaging system to which this invention is applied.

An imaging (image pick up) system according to this invention is directed to an imaging system adapted for detecting a moving object (body) 2 transferred (conveyed) along a transfer path 1 comprised of belt conveyer, etc. by means of a position sensor 3 to pick up an image of still picture on the basis of a detection output of the position sensor 3 as shown in FIG. 7, for example, and includes an image pick-up apparatus (unit) comprising a CCD camera 10 for carrying out image pick-up in accordance with a detection output of the position sensor 3 to output a video signal, and a control unit 20 for carrying out control of the operation of the CCD camera 10, and an image taking-in unit 30 for delivering external synchronizing signals EXT-HD, EXT-VD to the control unit 20, and for taking thereinto a video signal from the CCD camera 10.

In this imaging system, the position sensor 3 detects the moving object 2 transferred along the transfer path 1 to generate a trigger signal TRIG-IN when the moving object 2 reaches the front surface of the position sensor 3 to deliver it to the control unit 20 and the image taking-in unit 30.

The control unit 20 controls timing of exposure at the CCD camera 10 on the basis of the trigger signal TRIG-IN delivered from the position sensor 3, and controls, on the basis of the write enable signal WE delivered from the image taking-in unit 30, timing at which the CCD camera 10 outputs a video signal.

The CCD camera 10 picks up an image of the moving object on the basis of control from the control unit 20 to output a video signal at a timing based on control from the control unit 20 to deliver it to the image taking-in unit 30. The image taking-in unit 30 is adapted to take thereinto the video signal from the CCD camera 10.

In more detail, the control unit 20 comprises, as shown in FIG. 7 mentioned above, terminals C1, C2 for delivering horizontal and vertical synchronizing signals SG-HD, SG-VD to the CCD camera 10, terminals C3, C4 for delivering horizontal and vertical modulated synchronizing signals TG-HD, TG-VD to the CCD camera 10, a terminal C5 supplied with a trigger signal TRIG-IN based on detection of the moving object 2 from the position sensor 3, and a terminal C6 delivering, to the CCD camera 10, a pulse width adjusted trigger signal TRIG-OUT obtained by adjusting the pulse width of the trigger signal TRIG-IN delivered to the terminal C5.

Moreover, the control unit 20 comprises terminals C7, C8 supplied with external synchronizing signals EXT-HD, EXT-VD from the image taking-in unit 30, a terminal C9 supplied with write enable signal WE from the image taking-in unit 30, a synchronizing signal generating section 21 for generating synchronizing signals SG-HD, SG-VD on the basis of the external synchronizing signals EXT-HD, EXT-VD delivered from the image taking-in unit 30 to the terminals C7, C8 to output the generated synchronizing signals SG-HD, SG-VD to the terminals C1, C2, and a modulated HD signal preparation section 22 for preparing modulated synchronizing signals TG-HD, TG-VD on the basis of the synchronizing signals SG-HD, SG-VD from the synchronizing signal generating section 21 and the write enable signal WE, etc. delivered to the terminal C9 to output the prepared modulated synchronizing signals TG-HD, TG-VD to the terminals C3, C4.

The synchronizing signal generating section 21 generates horizontal and vertical synchronizing signals SG-HD, SG-VD in accordance with the external synchronizing signals EXT-HD, EXT-VD delivered from the terminals C7, C8 to deliver them to the CCD camera 10 through the terminals C1, C2.

The modulated HD signal generating section 22 generates a modulated horizontal synchronizing signal TG-HD and a modulated vertical synchronizing signal TG-VD based on the synchronizing signals SG-HD, SG-VD and the write enable signal WE in accordance with the timing of the trigger signal TRIG-IN delivered from the terminal C5 to deliver them to the CCD camera 10 through the terminals C3, C4. Moreover, the modulated HD signal generating section 22 varies the frequency of the modulated horizontal synchronizing signal TG-HD in accordance with a set shutter speed to control exposure time, i.e., charge storage time of the CCD camera 10, and to control output of a video signal from the CCD camera 10 so that the video signal from the CCD camera 10 is delivered to the image taking-in unit 30 at a timing synchronous with the write enable signal WE delivered to the terminal C9.

The image taking-in unit 30 comprises, as shown in the FIG. 7 mentioned above, terminals C10, C11 for outputting external synchronizing signals EXT-HD, EXT-VD, a terminal C12 supplied with a video signal from the CCD camera 10, a terminal C13 for outputting the write enable signal WE, a terminal C14 supplied with the above-described trigger signal TRIG-IN from the position sensor 3, a synchronizing signal generating section 31 for generating external synchronizing signals EXT-HD, EXT-VD, a memory 32 for storing the video signal delivered to the terminal C12, and a write enable signal preparation section 33 for generating write enable signal WE on the basis of the trigger signal TRIG-IN delivered to the terminal C14 to deliver the generated write enable signal WE to the control unit 20 through the terminal C13.

The synchronizing signal generating section 31 generates external horizontal synchronizing signal EXT-HD and external vertical synchronizing signal EXT-VD to deliver them to the memory 32, and to deliver them to the control unit 20 through the terminals C10, C11. The write enable signal preparation section 33 generates write enable signal WE in accordance with the trigger signal TRIG-IN delivered to the terminal C14 to deliver it to the memory 32, and delivers it to the control unit 20 through the terminal C13. The memory 32 stores the video signal delivered from the CCD camera 10 to the terminal C12 in accordance with the write enable signal from the write enable signal preparation section 32.

Figure 8:
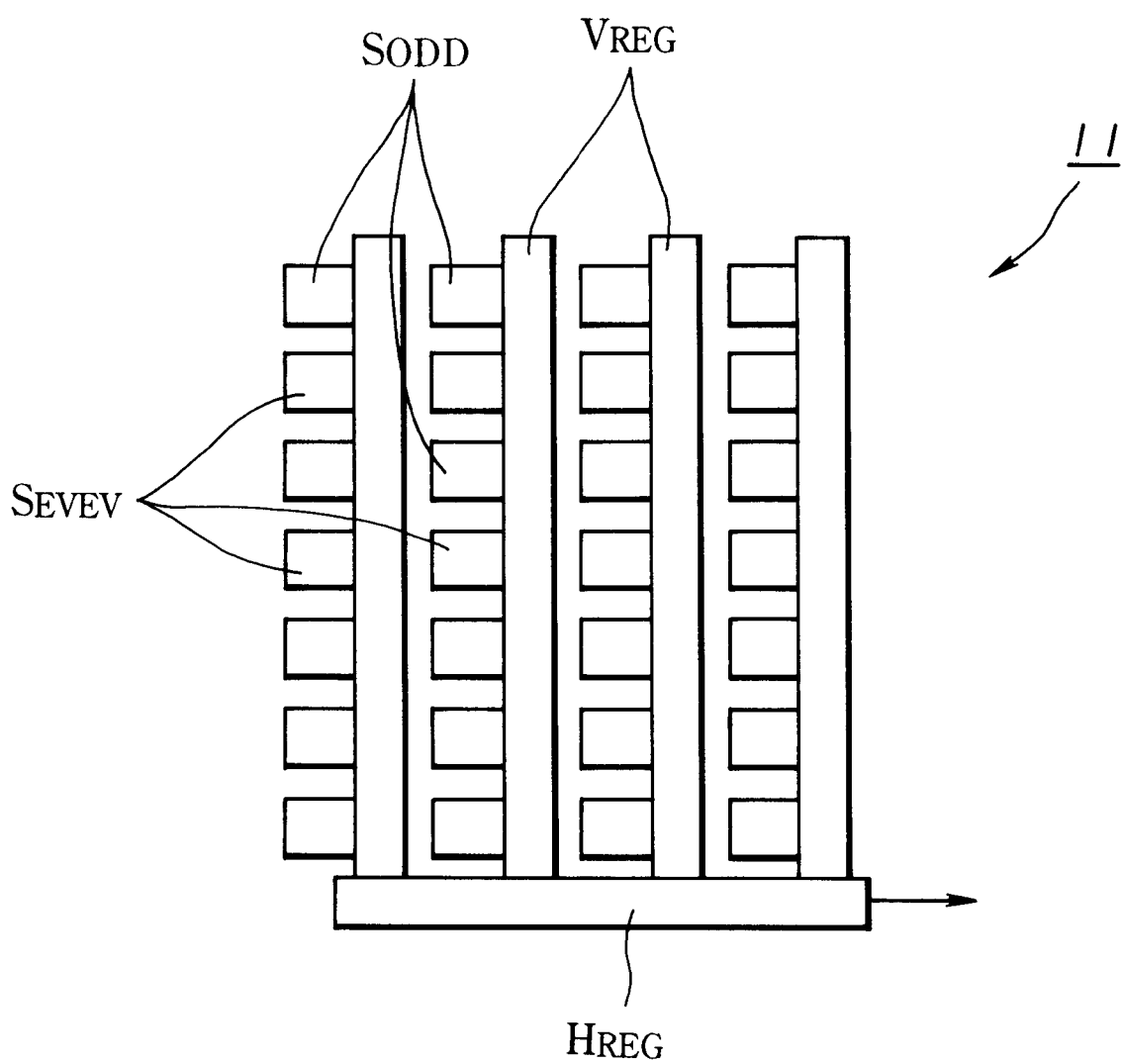
FIG. 8 is a plan view showing, in a model form, the configuration of an IT type CCD image sensor used in a CCD camera constituting the above-mentioned imaging system.

Moreover, the CCD camera 10 includes a CCD image sensor 11 of the Interline Transfer (IT) type of a structure as shown in FIG. 8, for example. This IT type CCD image sensor 11 is composed of light receiving portions $S_{ODD}$ corresponding to respective pixels of the odd field, light receiving portions $S_{EVEN}$ corresponding to respective pixels of the even field, vertical transfer portions $V_{REG}$ to which charges stored in the respective light receiving portions $S_{ODD}$, $S_{EVEN}$ are read out, and a horizontal transfer portion $H_{REG}$ for outputting, as an image pick-up signal of one horizontal line unit, the charges which have been read out to the vertical transfer portions $V_{REG}$, and has an electronic shutter function to control potential of the substrate formed below the light receiving portions $S_{ODD}$, $S_{EVEN}$ to thereby sweep out the charges stored in the respective light receiving portions $S_{ODD}$, $S_{EVEN}$ into the substrate, thus to control the charge storage time.

Figure 9:
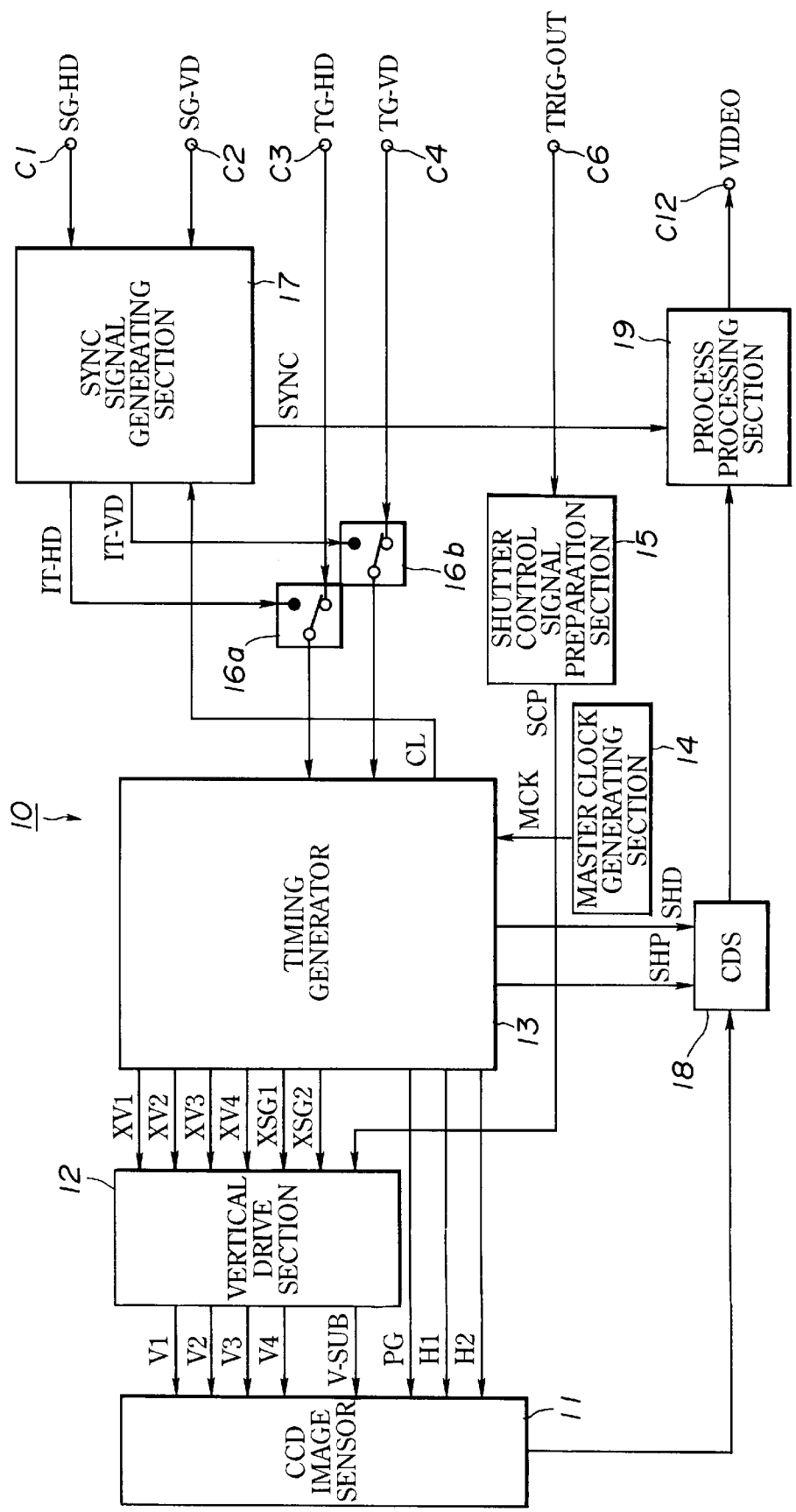
FIG. 9 is a block diagram showing a more detailed configuration of the CCD camera.

The CCD camera 10 comprises, as shown in FIG. 9, a vertical drive section 12 for controlling transfer of charges in the vertical transfer portions to which the charges stored in the light receiving portions of the CCD image sensor 11 are read out, a timing generator 13 which generates a signal for driving the vertical drive section 12, etc., a master clock generating section 14 for delivering a master clock MCK of about 28.6 MHz to the timing generator 13, and a shutter control signal preparation section 15 for preparing a shutter control signal SCP on the basis of the trigger signal TRIG-OUT delivered to the terminal C6 to deliver it to the CCD image sensor 11.

Moreover, the CCD camera 10 comprises switches 16a, 16b for carrying out switching between horizontal synchronizing signals IT-HD/TG-HD and vertical synchronizing signals IT-VD/TG-VD delivered to the timing generator 13, a synchronizing signal generating section 17 for generating internal synchronizing signals IT-HD, IT-VD on the basis of the horizontal synchronizing signal SG-HD and the vertical synchronizing signal SG-VD delivered from the terminals C1, C2, a Correlated Double Sampling circuit (hereinafter referred to as CDS circuit) 18 for carrying out so called correlated double sampling on the basis of sampling pulses SHP, SHD delivered from the timing generator 13 with respect to an image pick-up signal delivered from the CCD image sensor 11 to eliminate noise such as reset noise, etc. included in the image pick-up signal, and a process processing section 19 operative on the basis of synchronizing signal SYNC delivered from the synchronizing signal generating section 17 to implement so called process processing to the image pick-up signal delivered from the CDS circuit 18 to output the image pick-up signal thus processed as a video signal.

This CCD camera 10 carries out switching of the above-mentioned switches 16a, 16b to thereby conduct switching between the ordinary operation mode for carrying out image pick-up of moving picture on the basis of the internal synchronizing signals IT-HD, IT-VD from the timing generator 13 and random shutter mode for carrying out image pick-up of still picture in accordance with the modulated synchronizing signals TG-HD, TG-VD delivered to the terminals C3, C4.

In more practical sense, the synchronizing signal generating section 17 generates internal synchronizing signals IT-HD, IT-VD from the horizontal synchronizing signal SG-HD delivered from the terminal C1 and the vertical synchronizing signal SG-VD delivered from the terminal C2 to deliver them to the switches 16a, 16b. The switch 16a selectively delivers, to the timing generator 13, one of the modulated horizontal synchronizing signal TG-HD delivered from the terminal C3 and the internal horizontal synchronizing signal IT-HD delivered from the synchronizing signal generating section 17. The switch 16b selectively delivers, to the timing generator 13, one of the modulated vertical synchronizing signal TG-VD delivered from the terminal C4 and the internal vertical synchronizing signal IT-VD delivered from the synchronizing signal generating section 17.

Moreover, this imaging system is adapted so that when it is operative in the random shutter mode, horizontal and vertical synchronizing signals TG-HD, TG-VD delivered to the terminals C3, C4 are delivered to the timing generator 13 through the switches 16a, 16b.

Further, this timing generator 13 is operative so that it counts, by nine (9), the number of pulses of the modulated horizontal synchronizing signal TG-HD from the time point of start of exposure of the CCD image sensor 11 thereafter to form a read-out signal RO2 for reading out charges stored in the light receiving portions of the CCD image sensor 11 to the vertical transfer portions of the CCD image sensor 11. For this reason, the charge storage time of the CCD image sensor 11 is sum of the time required for counting, by nine (9), the number of pulses of the modulated horizontal synchronizing signal TG-HD and a predetermined time required for forming the read-out signal RO2.

Figure 10:
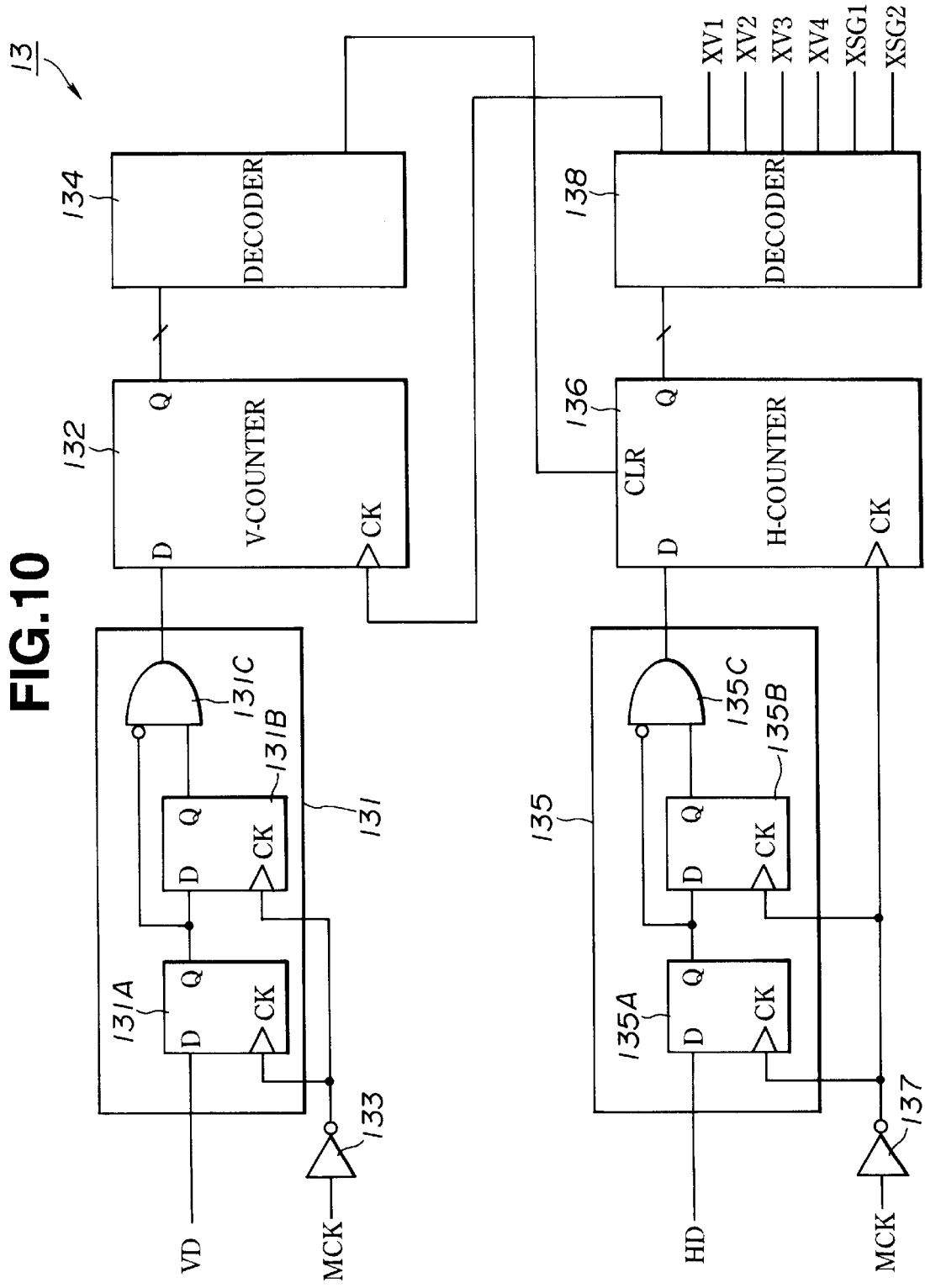
FIG. 10 is a block diagram showing a more detailed configuration of a timing generator constituting the CCD camera.

In this example, the above-mentioned timing generator 13 is constituted as shown in FIG. 10, for example. Namely, the timing generator 13 is composed of an edge detecting circuit 131 supplied with vertical synchronizing signal TG-VD/IT-VD selected by the switch 16b, a V-counter 132 adapted so that an output of the edge detecting circuit 131 is delivered to its data input terminal, an inverter 133 for inverting master clock MCK from the master clock generating section 14 to deliver it to the edge detecting circuit 131, a decoder 134 supplied with output of the V-counter 132, an edge detecting circuit 135 supplied with horizontal synchronizing signal TG-HD/IT-HD selected by the switch 16a, a H-counter 136 adapted so that an output of the edge detecting circuit 135 is delivered to its data input terminal, an inverter 137 for inverting the master clock MCK from the master clock generating section 14 to deliver it to the edge detecting circuit 135 and the H-counter 136, and a decoder 138 supplied with output of the H-counter 136.

More particularly, the edge detecting circuit 131 is composed of cascade connected two flip-flops 131A, 131B adapted so that the master clock MCK inverted by the inverter 133 is delivered to the respective clock input terminals and a gate 131C supplied with outputs of the respective flip-flops 131A, 131B, wherein vertical synchronizing signal TG-VD/IT-VD selected by the switch 16b is delivered to the data input terminal of the flip-flop 131A. This edge detecting circuit 131 detects falling edge of the vertical synchronizing signal TG-VD/IT-VD to deliver an edge detection output of one (1) clock pulse width of the master clock MCK at a timing of the falling edge to the data input terminal of the V-counter 132. In this example, the clock input terminal of the V-counter 132 is supplied with a decode output of the decoder 138. Thus, the V-counter 132 counts decode output of the decoder 138 on the basis of edge detection output by the edge detecting circuit 131 to deliver the count output to the decoder 134.

Moreover, the edge detecting circuit 135 is composed of cascade connected two flip-flops 135A, 135B adapted so that master clock MCK inverted by the inverter 137 is delivered to the respective clock input terminals, and a gate 135C supplied with outputs of the respective flip-flops 135A, 135B, wherein the horizontal synchronizing signal TG-HD/IT-HD selected by the switch 16a is delivered to the data input terminal of the flip-flop 135A. This edge detecting circuit 135 detects falling edge of the horizontal synchronizing signal TG-HD/IT-HD to deliver, to the data input terminal of the H-counter 136, an edge detection output of one (1) clock pulse width of the master clock MCK at a timing of the falling edge. In this example, the clear input terminal of the H-counter 136 is supplied with a decode output of the decoder 134.

The H-counter 136 counts the number of pulses of the master clock MCK on the basis of edge detection output delivered from the edge detecting circuit 135 to the data input terminal to deliver its count output to the decoder 138.

Further, the decoder 138 decodes count output of the H-counter 136 to thereby generate various drive timing signals XV1, XV2, XV3, XV4, XSG1, XSG2, PG, H1, H2 of the CCD image sensor 11.

Figure 11:
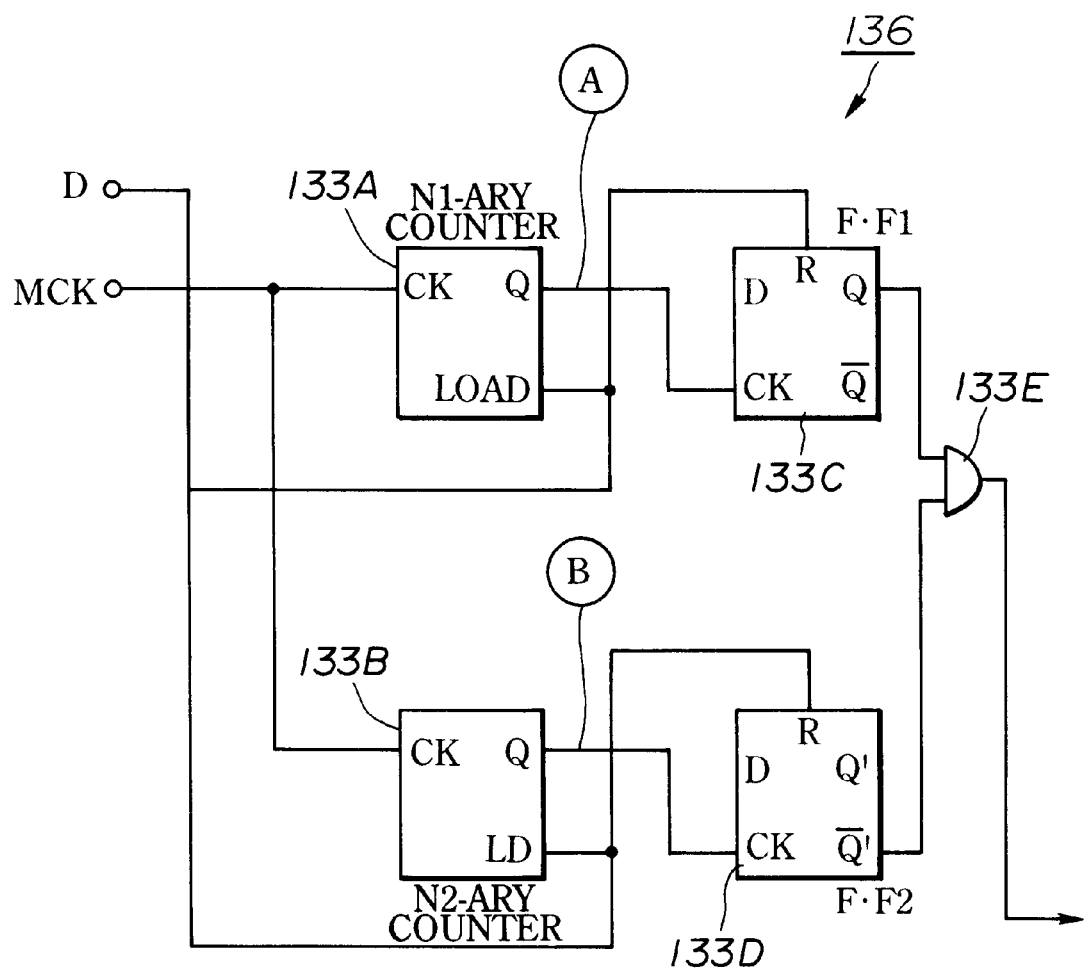
FIG. 11 is a block diagram showing a more detailed configuration of H-counter constituting the timing generator.

In this example, the H-counter 136 comprises, as shown in FIG. 11, counters 133A, 133B adapted so that an edge detection output by the edge detecting circuit 135 is delivered to the respective load terminals, flip-flops 133C, 133D adapted so that the edge detection output is delivered to the respective reset terminals, and a gate 133E supplied with respective outputs Q, $\overline{Q}$ of the flip-flops 133C, 133D.

Figure 12:
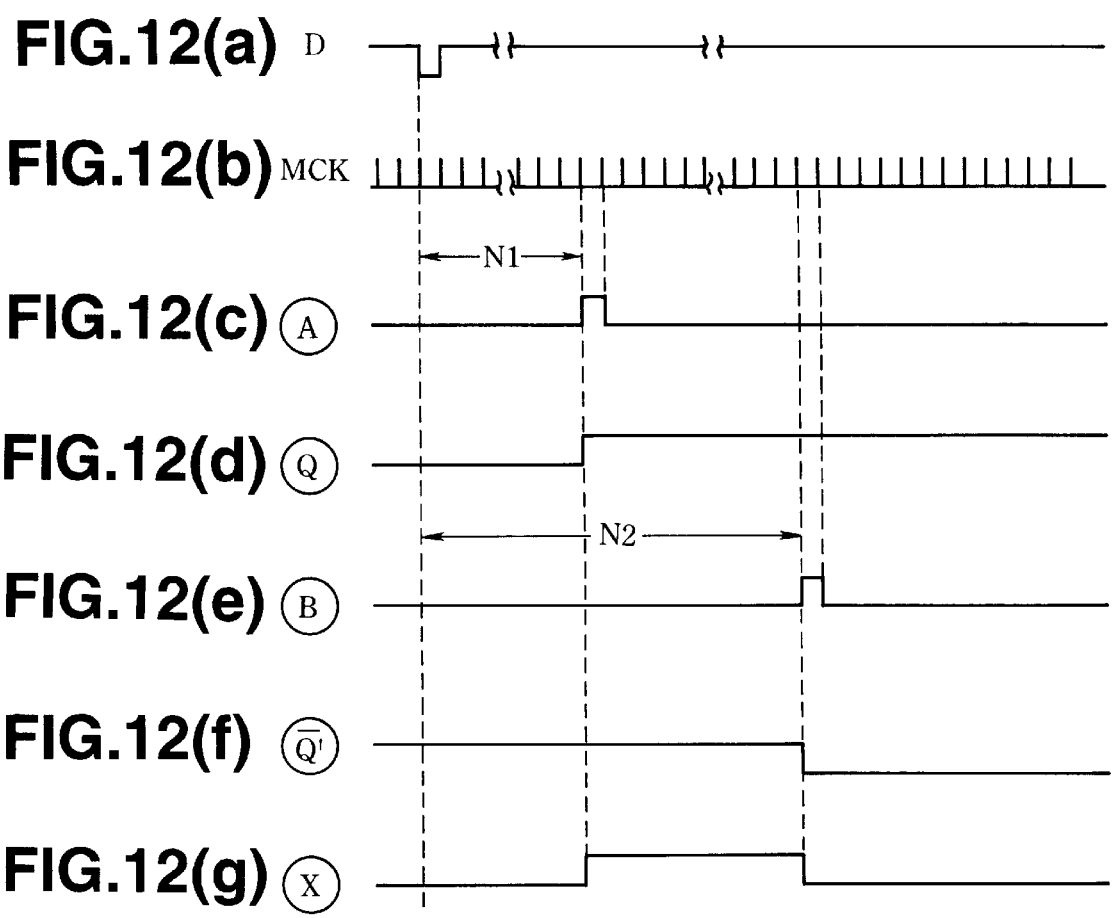
FIG. 12 is a timing chart showing the operation of the H-counter.

The counter 133A is N1-ary counter for counting the number of pulses of the master clock MCK, wherein the clock input terminal is supplied with a master clock MCK as shown in FIG. 12(b) inverted by the inverter 137. This counter 133A is operative so that in the case where the period of the edge detection output shown in FIG. 12(a) delivered to its load terminal is longer than N1, it delivers, to the clock input terminal of the flip-flop 133C, one pulse A at the time point where N1 number of pulses are counted as shown in FIG. 12(c) as its count output. The flip-flop 133C delivers, to the gate 133E, an output Q as shown in FIG. 12(d) of which state is inverted by count output from the counter 133A.

Moreover, the counter 133B is N2 (N1<N2)-ary counter for counting the number of pulses of the master clock, wherein the clock input terminal is supplied with master clock MCK as shown in FIG. 12(b) inverted by the inverter 137. This counter 133B is operative so that in the case where the period of the edge detection output shown in FIG. 12(a) delivered to the load terminal is longer than N2, it delivers, to the clock input terminal of the flip-flop 133D, one pulse B at the time point where N2 number of pulses are counted as shown in FIG. 12(e) as its count output. The flip-flop 133D delivers, to the gate 133E, an output $\overline{Q}$' as shown in FIG. 12(f) of which state is inverted by count output from the counter 133B.

The gate 133E is a logical product (AND) circuit and forms an output pulse X as shown in FIG. 12(g) which rises after N1 number of pulses are counted from the timing of the falling of the edge detection output by the edge detecting circuit 135 and falls after N2 number of pulses are counted from the abovementioned falling timing, as logical product output of the outputs Q, $\overline{Q}$' of the respective flip-flops 133C, 133D.

In the H-counter 136 of such a configuration, when the period of the edge detection output by the edge detecting circuit 135 is shorter than the N1 (e.g., in the case where the count value of N1 is 40 and the period of the edge detection output is 4), outputs Q, $\overline{Q}$' of the respective flip-flops 133C, 133D are caused to be both at low level. As a result, the output pulse X also becomes a low level.

Figure 13:
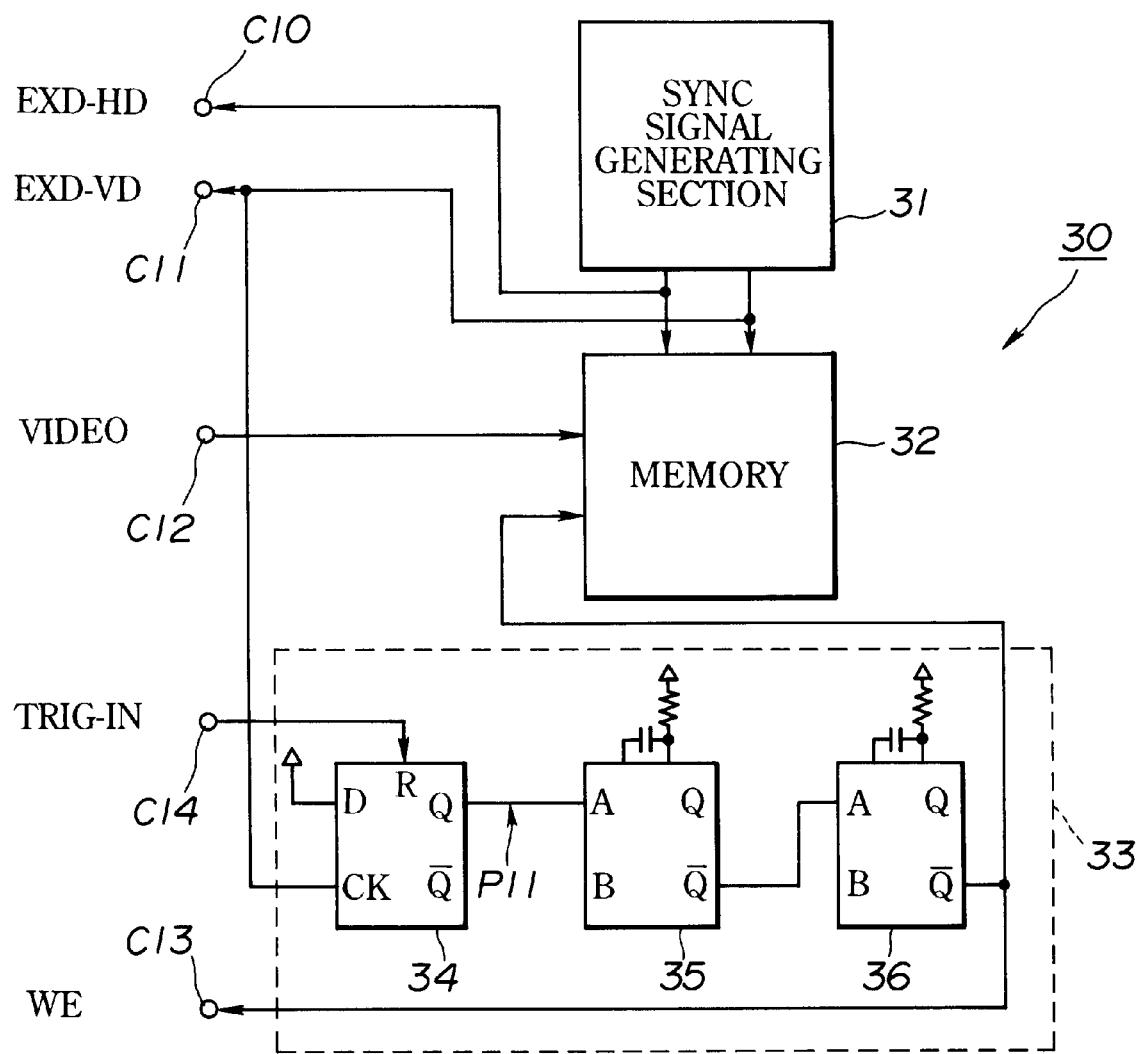
FIG. 13 is a block diagram showing a more detailed configuration of write enable signal preparation section constituting image taking-in unit of the imaging system.

Moreover, the write enable signal preparation section 33 of the image taking-in unit 30 comprises, as shown in FIG. 13, for example, a flip-flop 34 supplied, at the clock terminal CK, with external vertical synchronizing signal EXT-VD and reset by the trigger signal TRIG-IN delivered from the position sensor 3 through terminal C14, and mono-multi vibrators 35, 36 for forming a pulse signal of a predetermined length from output of the flip-flop 34, and is operative to generate a write enable signal WE corresponding to the trigger signal TRIG-IN delivered to the terminal C14 to deliver it to the memory 32, and to deliver it to the control unit 20 through terminal C13.

Figure 14:
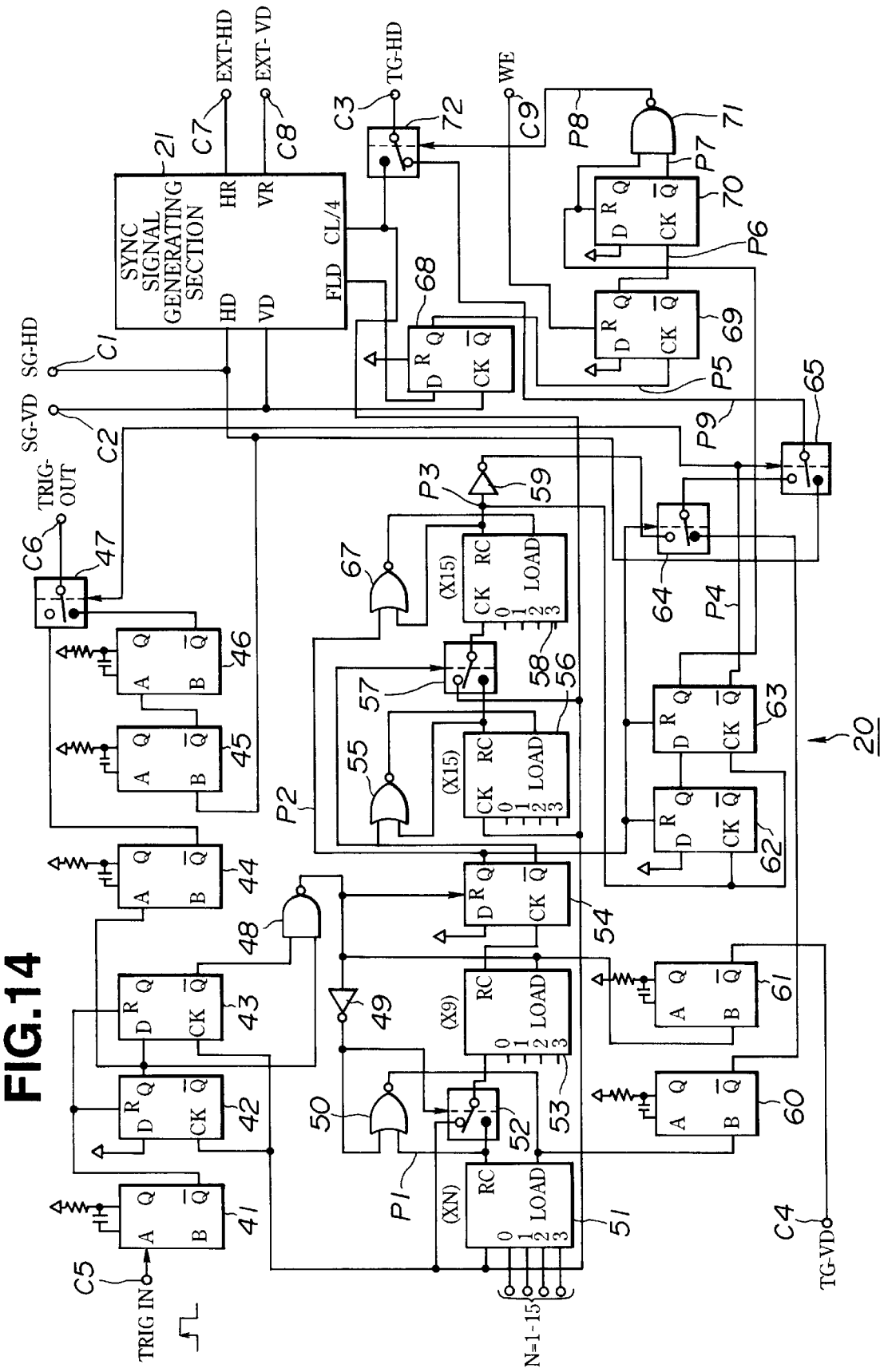
FIG. 14 is a circuit diagram showing a more detailed configuration of modulated HD signal preparation section constituting control unit of the imaging system.

On the other hand, the above-mentioned control unit 20 comprises, as shown in FIG. 14, for example, a mono-multi vibrator 41 for generating a pulse signal of a predetermined length in accordance with the trigger signal TRIG-IN delivered to the terminal C5, flip-flops 42, 43 which are reset by an output of the mono-multi vibrator 41 and are operative to form a pulse signal synchronous with a ¼ frequency division clock (hereinafter referred to as CL/4 signal) having a frequency of about 3.5 MHz obtained by allowing clock CL of about 14.3 MHz, which is obtained by allowing the master clock delivered from the synchronizing signal generating section 21 to undergo frequency-division into one half (½), to undergo frequency-division into one fourth (¼) by using the CL/4 signal as clock, a mono-multi vibrator 44 for forming a pulse signal of a predetermined length on the basis of output Q of the flip-flop 42, mono-multi vibrators 45, 46 for adjusting pulse width of the horizontal synchronizing signal SG-HD delivered from the synchronizing signal generating section 21, and the like.

Moreover, the control unit 20 includes a counter 51 for frequency-dividing the CL/4 signal, and the like, and allows the frequency division ratio at the counter 51 to be changeable (adjustable) to thereby form a frequency varied (changed) signal to vary the frequency of the modulated horizontal synchronizing signal TG-HD on the basis of the signal.

Further, the control unit 20 includes flip-flops 69, 70 reset by the write enable signal WE delivered to the terminal C9, and the like, and is operative to select, by a switch 72, one of a signal delivered through switches 64, 65, etc. from a counter 58 and the CL/4 signal from the synchronizing signal generating section 21 to deliver it as the modulated horizontal synchronizing signal TG-HD to the CCD camera 10 through the terminal C3 to thereby control the timing of output of a video signal from the CCD camera 10 so that the video signal from the CCD camera 10 is delivered to the image taking-in unit 30 at a timing synchronous with the write enable signal WE.

In more practical sense, the mono-multi vibrator 41 of the control unit 20 delivers signal shown in FIG. 15(b) to the reset terminals of the flip-flops 42, 43 on the basis of the trigger signal TRIG-IN shown in FIG. 15(a).

The flip-flop 42 is ordinarily supplied, at the reset terminal, with an output of high level from the mono-multi vibrator 41, and is placed in the state where its output Q is caused to be at high level. However, when the output $\overline{Q}$ of the mono-multi vibrator 41 delivered to the reset terminal as described above shifts to low level, the flip-flop 42 is reset. As a result, its output Q is caused to be at low level. When output $\overline{Q}$ of the mono-multi vibrator 41 shifts to high level, output Q of the flip-flop 42 is caused to be at high level in synchronism with rising of the above-described CL/4 signal shown in FIG. 15(c).

The flip-flop 43 is reset by output $\overline{Q}$ of the mono-multi vibrator 41 similarly to the above-described flip-flop 42. As a result, its output $\overline{Q}$ is caused to be at high level as shown in FIG. 15(e). When output of the flip-flop 42 shifts to high level, output $\overline{Q}$ of the flip-flop 43 shifts to low level in synchronism with rising of the CL/4 signal subsequently delivered.

The output Q of the flip-flop 42 is delivered to a switch 47 through the mono-multi vibrator 44. By this switch 47, there is carried out selective switching between the output Q and continuous pulses generated by the mono-multi vibrators 45, 46 in synchronism with the horizontal synchronizing signal SG-HD from the synchronizing signal generating section 21. Thus, a trigger signal TRG-OUT as shown in FIG. 15(g), for example, is formed, and this trigger signal TR1 is delivered to the CCD camera 10 through the terminal C6.

Moreover, the output Q of the flip-flop 42 and the output $\overline{Q}$ of the flip-flop 43 described above are delivered to a gate 48. By this gate 48, NOR (not logical sum) output is obtained. The output of the gate 48 is a signal synchronous with the first CL/4 signal after high level time period is completed (the trigger signal TRIG-IN becomes inactive) as shown in FIG. 15(f).

An output of the gate 48 is delivered to a mono-multi vibrator 61. Thus, the mono-multi vibrator 61 adjusts the pulse width of output of the gate 48 shown in FIG. 16(a), for example, to deliver the pulse width adjusted output to the CCD camera 10 through the terminal C4 as modulated vertical synchronizing signal TG-VD as shown in FIG. 16(d).

Further, the output of the gate 48 is inverted by inverter 49. Then, NOR (not logical sum) output of this output and output P1 of the counter 51 is obtained at a gate 50. The output from the gate 50 thus obtained is delivered to the load terminal of the counter 51. Moreover, the output of the gate 48 is delivered to flip-flop 54, etc., and is also delivered to the load terminal of the counter 53.

The counter 51 allows the CL/4 signal to undergo frequency-division into 1/N on the basis of a ratio N (N:1~15) set in advance by setting of control input to deliver a signal P1 having a period N times greater than that of the CL/4 signal to the gate 50, and delivers it to the counter 53 through a switch 52.

The gate 50 provides NOR (not logical sum) output of the signal P1 delivered from the counter 51 and an output of the gate 49 to deliver a signal as shown in FIG. 16(b) to the load terminal of the counter 51 and a mono-multi vibrator 60. The mono-multi vibrator 60 adjusts the pulse width of output of the gate 50 to deliver the pulse width adjusted output of the gate 50 to a switch 64.

An output of the mono-multi vibrator 60 is delivered to the CCD camera 10 through switches 64, 65, 72 and terminal C3 as the modulated horizontal synchronizing signal TG-HD as shown in FIG. 16(c).

Now, the signal relationship of the horizontal and vertical synchronizing signals SG-HD, SG-VD from the above-described synchronizing signal generating section 21 and the trigger signal TRIG-IN, etc. is illustrated, a timing chart as shown in FIGS. 17(a) to 17(m) is provided. Namely, FIG. 17(a) shows horizontal synchronizing signal SG-HD from the synchronizing signal generating section 21, FIG. 17(b) shows vertical synchronizing signal SG-VD from the synchronizing signal generating section 21, and FIG. 17(d) shows the trigger signal TRIG-IN delivered from the position sensor 3.

FIG. 17(e) shows V-SUB for controlling voltage of the substrate of the CCD image sensor 11 from the vertical drive section 12. Charges stored (accumulated) in respective pixels of the light receiving section of the CCD image sensor 11 are swept out into the substrate of the CCD image sensor 11 when the signal V-SUB delivered to the substrate is caused to be at high level.

The output P1 of the above-described counter 51 is a pulse signal having higher frequency with respect to the horizontal synchronizing signal SG-HD from the synchronizing signal generating section 21 as shown in FIG. 17(f). The period Ta of the output P1 can be changed (adjusted) by setting of the counter 51 as described above.

Moreover, the switch 52 carries out switching between the CL/4 signal and the output P1 of the counter 51 on the basis of an output of the gate 49 to deliver an output obtained by switching to the counter 53. The counter 53 allows a signal delivered from the counter 51 through the switch 52 to undergo frequency-division into 1/9 to deliver it to the clock terminal of the flip-flop 54. The flip-flop 54 is reset in response to an output of the gate 48 to form a signal shown in FIG. 17(g). The signal formed at the flip-flop 54 is delivered to the load terminal of the counter 58 through a gate 67, and is delivered to the load terminal of the counter 56 through a gate 55.

Further, the switch 57 is supplied with output $\overline{Q}$ of the flip-flop 54, and is operative to selectively deliver, to the counter 58, one of an output of the counter 56 and the CL/4 signal on the basis of output $\overline{Q}$ of the flip-flop 54. The counters 56, 58 respectively allows signals inputted thereto to undergo frequency-division into 1/15. Namely, output P3 of the counter 58 becomes a signal obtained by allowing the CL/4 signal to undergo frequency-division into 1/15×15=225.

An output of the counter 58 is delivered to the clock terminals of the flip-flops 62, 63. These flip-flops 62, 63 are supplied, at their reset terminals, with the output Q of the above-described flip-flop 54. Moreover, the flip-flop 62 is such that its data input terminal is caused to be at high level at all times and its output Q is delivered to the data input terminal of the flip-flop 63. Namely, output P4 of the flip-flop 63 is caused to be at high level for a time period during which output P2 of the flip-flop 54 is at low level and for a time period (T1+T2) corresponding to two periods of output P3 of the counter 58 as shown in FIG. 17(i).

The switch 64 caused to undergo switching control by output P2 of the above-described flip-flop 54 shown in FIG. 17(g) serves to carry out selective switching between output P3 of the counter 58 delivered through the inverter 59 and output of the mono-multi vibrator 60, and is operative so that for a time period during which output P2 of the flip-flop 54 is at low level, it selects output of the mono-multi vibrator 60, for time periods except for the above, it selects an output of the inverter 59. Moreover, the switch 65 caused to undergo switching control by output P4 of the flip-flop 63 shown in FIG. 17(i) serves to carry out selective switching between select output of the switch 64 and horizontal synchronizing signal SG-HG delivered from the terminal C3, and is operative so that for a time period during which output P4 of the flip-flop 63 is at high level, it selects select output of the switch 64, and for time periods except for the above, it selects the horizontal synchronizing signal SG-HD. Thus, select output of the switch 64 is delivered from the terminal C3 to the CCD camera 10 as modulated horizontal synchronizing signal TG-HD shown in FIG. 17(j) through switches 65 and 72.

Meanwhile, the frequency of the output P2 of the flip-flop 54 shown in FIG. 17(g) is changed by setting at the above-described counter 51. Moreover, the frequency of the modulated horizontal synchronizing signal TG-HD varies in dependency upon frequency of output P2 of the flip-flop 54. Further, the charge storage time of the CCD image sensor 11 can be changed (adjusted) in dependency upon frequency of the modulated horizontal synchronizing signal TG-HD. Accordingly, in this imaging system, it is possible to change the charge storage time period of the CCD image sensor 11, i.e., the exposure time of the CCD camera 10 by setting at the counter 51.

Moreover, the write enable signal preparation section 33 of the image taking-in unit 30 is operative so that when trigger signal TRIG-IN shown in FIG. 18(a) is delivered from the position sensor 3, it generates write enable signal WE shown in FIG. 18(d) in synchronism with external vertical synchronizing signal EXT-VD shown in FIG. 18(b) delivered immediately thereafter to deliver this write enable signal WE to the memory 32, and to deliver it to the modulated HD signal preparation section 22 of the control unit 20 through the terminal C9.

In more practical sense, the flip-flop 34 of the write enable signal preparation section 33 is reset by the trigger signal TRIG-IN delivered to the terminal 14, and is operative with external vertical synchronizing signal EXT-VD from the external synchronizing signal generating section 31 being as clock. Namely, output P11 of the flip-flop 34 is caused to be at low level for a time period from the time when the trigger signal TRIG-IN is delivered up to termination of the first external vertical synchronizing signal EXT-IN.

Further, the write enable signal WE is (waveform-)shaped by mono-multi vibrators 35, 36 on the basis of the timing of the rising edge of output P11 of the flip-flop 34. The write enable signal WE thus obtained is delivered to the memory 32 and the terminal C13.

Moreover, the data input terminal of the flip-flop 68 of the control unit 20 is supplied with a field discrimination signal FLD for discriminating field of the synchronizing signal SG-HD, SG-VD shown in FIG. 19(f) from the synchronizing signal generating section 21. The flip-flop 69 is reset by the write enable signal WE from the image taking-in unit 30 shown in FIG. 19(e), and output P5 of the flip-flop 68 shown in FIG. 19(g) is inputted as clock. Namely, when the write enable signal WE is caused to be at low level as shown in FIG. 19(h), output P6 of the flip-flop 69 is caused to be at low level for a time period until the field discrimination signal FLD shown in FIG. 19(f) is secondly caused to be at high level, i.e., is caused to have becomes ODD field and output P5 of the flip-flop 68 inputted to the clock terminal rises.

The flip-flop 70 is reset by output Q of the above-described flip-flop 63, and is operative with output P6 of the flip-flop 69 being as clock. Namely, as shown in FIG. 19(i), output P7 of a flip-flop 70 is caused to be at high level for a time period until output P6 of the flip-flop 69 shown in FIG. 19(h) first shifts from low level to high level after output P4 of the flip-flop 63 shown in FIG. 19(c) has been caused to be at low level.

A gate 71 provides, as shown in FIG. 19(j), NAND (not logical product) output of output P7 of the flip-flop 70 and output Q of the flip-flop 63, whereby when NAND output is caused to be at low level, it controls the switch 72 so that CL/4 signal is delivered to the terminal C3. Namely, for a time period during which output P8 of the gate 71 is at low level, i.e., for vertical transfer stop time period during which transfer of the vertical transfer register of the CCD image sensor 11 is stopped, the CL/4 signal is delivered to the CCD camera 10 as modulated horizontal synchronizing signal TG-HD.

Moreover, FIG. 19(a) shows trigger signal TRIG-IN, FIG. 19(b) shows output P9 of the switch 65, FIG. 19(d) shows modulated vertical synchronizing signal TG-VD, and FIG. 19(m) shows video signal VIDEO outputted from the CCD camera 10.

Meanwhile, as described above, the timing generator 13 of the CCD camera 10 counts, by nine (9), the number of pulses of the modulated horizontal synchronizing signal TG-HD thereafter to form a read-out signal for reading out charges stored in the light receiving portions of the CCD image sensor 11 to the vertical transfer portions of the CCD image sensor 11. Namely, the timing generator 13 forms read-out signal RO2 shown in FIG. 17(m).

For this reason, the exposure time in the CCD image sensor 11 becomes time period from the time when trigger signal TRIG-IN shown in FIG. 17(d) is delivered until read-out signal RO2 shown in FIG. 17(m) is delivered. In this case, FIG. 17(c) shows timing at which the read-out signal RO1 in the conventional image pick-up apparatus is delivered, and FIG. 17(k) shows modulated vertical synchronizing signal TG-VD.

Sums of charges which have been read to the vertical transfer section as described above are respectively determined every two pixels adjacent in upper and lower directions on the basis of control from the timing generator 13. Further, the timing generator 13 is operative so that in the case where, e.g., horizontal synchronizing signal SG-HD shown in FIG. 20(a) is delivered, it generates vertical transfer signals XV1, XV2, XV3, XV4 shown in FIGS. 20(d) to (g) at predetermined time intervals. In this example, charges the which have been transferred to the vertical transfer portions are transferred in a vertical direction by the well known four-phase drive system.

In more practical sense, the timing generator 13 counts, by 44, clock pulses shown in FIG. 20(c) obtained by allowing the master clock MCK of about 28 MHz delivered from the master clock generator 14 shown in FIG. 20(b) to undergo frequency-division into ½ from the timing at which the horizontal synchronizing signal SG-HD is caused to be at low level thereafter to allow the vertical transfer signal XV1 to be at high level to further count, by 27, the number of pulses of the clock CL from this time point thereafter to allow the vertical transfer signal XV1 to be at low level. In this case, in the timing generator 13, count operation of the clock CL is carried out by H-counter 136 reset by the above-described horizontal synchronizing signal SG-HD.

Meanwhile, the CL/4 signal is included in the modulated horizontal synchronizing signal TG-HD as described above. For this reason, in the case where the modulated horizontal synchronizing signal TG-HD is delivered to the timing generator 13, for a time period during which the CL/4 signal shown in FIG. 21(b) is delivered, i.e., for the vertical transfer stop time period, the H-counter 136 which counts the number of pulses of the clock CL is reset every four periods of the clock CL, it is impossible to count the number of pulses of the clock CL by 44 (i.e., carry out 44 count operations). For this reason, this timing generator 13 does not form vertical transfer signals XV1 to XV4 for a time period during which the CL/4 is delivered as the modulated horizontal synchronizing signal TG-HD. Namely, for this time period, vertical transfer is stopped at the vertical transfer section of the CCD image sensor 11. FIG. 21(a) shows ordinary horizontal synchronizing signal SG-HD and FIG. 21(c) shows vertical transfer signal XV1.

In this imaging system, as described above, the CL/4 signal is delivered as the modulated horizontal synchronizing signal TG-HD to thereby stop vertical transfer of charges in the vertical transfer section of the CCD image sensor 11.

Moreover, supply of the CL/4 signal as the modulated horizontal synchronizing signal TG-HD is stopped at the timing of rising of the vertical synchronizing signal VD immediately after rising of the first field discrimination signal FLD after the write enable signal WE is delivered as shown in FIG. 19(k). The timing generator 13 starts generation of the vertical transfer signals XV1 to XV4 at this timing to deliver the vertical transfer signals XV1 to XV4 thus generated to the CCD image sensor 11 through the vertical drive section 12.

Then, the vertical transfer portions of the CCD image sensor 11 successively transfer charges on the basis of the vertical transfer signals XV1 to XV4 delivered thereto to output them as an image pick-up signal. Thus, the image pick-up signal synchronous with the vertical synchronizing signal TG-VD of the first ODD field after the write enable signal WE is delivered is outputted from the CCD image sensor 11.

In this imaging system, an approach is employed as described above to control the timing at which the supply of the CL/4 signal as the modulated horizontal synchronizing signal TG-HD is stopped to thereby control vertical transfer of the vertical transfer section of the CCD image sensor 11 to control the timing of output of the image pick-up signal at the timing corresponding to the write enable signal WE from the image taking-in unit 30.

In this example, as described above, this image pick-up apparatus detects moving object 2 by position sensor 3 to generate trigger signal TRG-IN on the basis of that timing to control the imaging (image pick-up) timing of the CCD camera 10 on the basis of the trigger signal TRIG-IN.

As described above, the modulated HD signal preparation section 22 of the control unit 20 generates trigger signal TRIG-OUT having a predetermined pulse length on the basis of the trigger signal TRIG-IN delivered to the terminal C5 to deliver this trigger signal TRIG-OUT to the CCD camera 10 through the terminal C6.

Moreover, as described above, the modulated HD signal preparation section 22 is operative so that when trigger signal TRIG-IN is delivered from the terminal C5, it generates modulated horizontal synchronizing signal TG-HD and modulated vertical synchronizing signal TG-VD on the basis of external synchronizing signals EXT-HD, EXT-VD from the synchronizing signal generating section 21, and inserts, for the vertical transfer stop time period, the CL/4 signal into the modulated horizontal synchronizing signal TG-HD on the basis of the write enable signal WE from the image taking-in unit 30 to conduct a control so as to stop transfer of charges in the vertical transfer portions of the CCD image sensor 11.

Then, the timing generator 13 of the CCD camera 10 delivers read-out signal RO2 to the CCD image sensor 11 so as to read out, to the vertical transfer portions, the charges stored (accumulated) in the light receiving portions of the CCD image sensor 11 after a predetermined charge storage time is passed.

Moreover, as described above, the timing generator 13 delivers vertical transfer signals V1 to V4 to the vertical transfer portions of the CCD image sensor 11 at the timing of termination of the CL/4 in the modulated horizontal synchronizing signal TG-HD is completed. The CCD image sensor 11 sequentially outputs, as an image pick-up signal, the charges which have been read out to the vertical transfer portions. These image pick-up signals are caused to be video signals through the CDS18 and the process processing section 19, and are delivered to the image taking-in unit 30.

As described above, the CL/4 signal inserted into the modulated horizontal synchronizing signal TG-HD is stopped at the timing of the vertical synchronizing signal TG-VD of the first ODD field after the write enable signal WE is delivered. For this reason, output of the image pick-up signal from the CCD image sensor 11 is started at this timing. Thus, video signal from the CCD camera 10 delivered to the image taking-in unit 30 is outputted in synchronism with the modulated vertical synchronizing signal TG-HD when the field discrimination signal FLD from the synchronizing signal generating section 21 indicates the ODD field as shown in FIG. 22(d), for example.

As a result, in this imaging system, it is possible to deliver, to the image taking-in unit 30, video signals from the CCD camera 10 in synchronism with the write enable signal WE and the external vertical synchronizing signal EXT-VD from the image taking-in unit 30. For this reason, it is possible to control, from the image taking-in unit 30, output timing of the video signal from the CCD camera 10. Thus, taking-in of image can be securely carried out.

Meanwhile, as described above, in this imaging system, video signal is outputted in synchronism with the first ODD field after the write enable signal WE from the image taking-in unit 30. For this reason, in the case where the write enable signal WE is delivered in the middle of the ODD field as shown in FIG. 22(b), time about 2.8 times greater than the vertical scanning period is required from start of the trigger signal TRIG-IN shown in FIG. 22(a) up to output of the video signal shown in FIG. 22(d). On the contrary, in the case where the write enable signal WE is delivered in the middle of the EVEN field as shown in FIG. 23(b), video signal shown in FIG. 23(d) is outputted in time about 1.2 times greater than the vertical scanning period from start of the trigger signal TRIG-IN shown in FIG. 23(a). In this case, FIGS. 22(c) and 23(c) show field discrimination signal FLD.

Moreover, in the above-described imaging system, as shown in FIG. 24, for example, image 80 of the ODD field and image 81 of the EVEN field based on an image pick-up signal outputted from the CCD image sensor 11 are respectively outputted at the ODD field and the EVEN field of the video signal. For this reason, in the case where those images are displayed on a monitor, they can be reproduced as a normal image.

Meanwhile, in the case where, e.g., image 80 of the ODD field and image 81 of the EVEN field of the CCD image sensor 11 are respectively outputted as fields in which the relationship between odd and even is opposite to the above, image of the ODD field of the CCD image sensor 11 is displayed in the EVEN field 82 on the monitor and image of the EVEN field of the CCD image sensor 11 is displayed in the ODD field 83 on the monitor as shown in the FIG. 22 mentioned above. As a result, positional shift (deviation) takes place.

However, there are instances where such positional shift does not become problem for a certain use purpose because it only exists by one line. Alternatively, there are instances where the above-described time until video signal is outputted from the trigger signal TRIG-IN is long, such positional shift may become problem.

In such cases, video signal from the CCD camera 10 may be outputted in the field immediately after the write enable signal WE is delivered. In more practical sense, it is sufficient that the flip-flop 68 is omitted in the modulated HD signal preparation section 22 of the control unit 20 to deliver vertical synchronizing signal SG-VD as clock for the flip-flop 69.

In this case, when the write enable signal WE shown in FIG. 25(c) is delivered for a time period of the EVEN field, the video signal from the CCD camera 10 is outputted in the next ODD field as shown in FIG. 25(d). At this time, video signal is outputted in a time 1.5 times greater than the vertical scanning period after the trigger signal TRIG-IN shown in FIG. 25(a) is delivered.

Moreover, when the write enable signal WE shown in FIG. 25(c) is delivered for the ODD field time period, video signal is outputted in the next EVEN field as shown in FIG. 25(d). At this time, video signal is outputted in a time about 1.2 times greater than the vertical scanning period after the trigger signal TRIG-IN shown in FIG. 25(a) is delivered.

As a result, in the case where it is sufficient that the video signal from the CCD camera 10 is outputted at the timing in any one of the ODD field and the EVEN field without being limited to the ODD field as described above, the time required until the video signal is outputted after the trigger signal TRIG-IN is delivered from the position sensor 3 is shortened. In this case, FIG. 25(b) shows vertical synchronizing signal EXT-VD.

As is clear from the foregoing description, the imaging system according to this invention can control, on the basis of the write enable signal WE from the image taking-in unit 30, the timing at which a video signal is outputted from the CCD camera 10 on the basis of the trigger signal TRIG-IN from the position sensor 3. For this reason, in this imaging system, it is possible to arbitrarily set, depending upon circumstances (needs) of the image taking-in unit 30, the timing at which the video signal is outputted from the CCD camera 10. Accordingly, the image taking-in unit 30 can securely take image thereinto.

While it has been shown in the above-described embodiment a configuration to prepare write enable signal WE at the write enable signal preparation section 33 of the image taking-in unit 30 to allow the control unit 20 to control the output timing of a video signal from the CCD camera 10 on the basis of the write enable signal WE, when there is a time margin in writing into the memory 32, write enable signal WE may be generated at the control unit 20.

Figure 26:
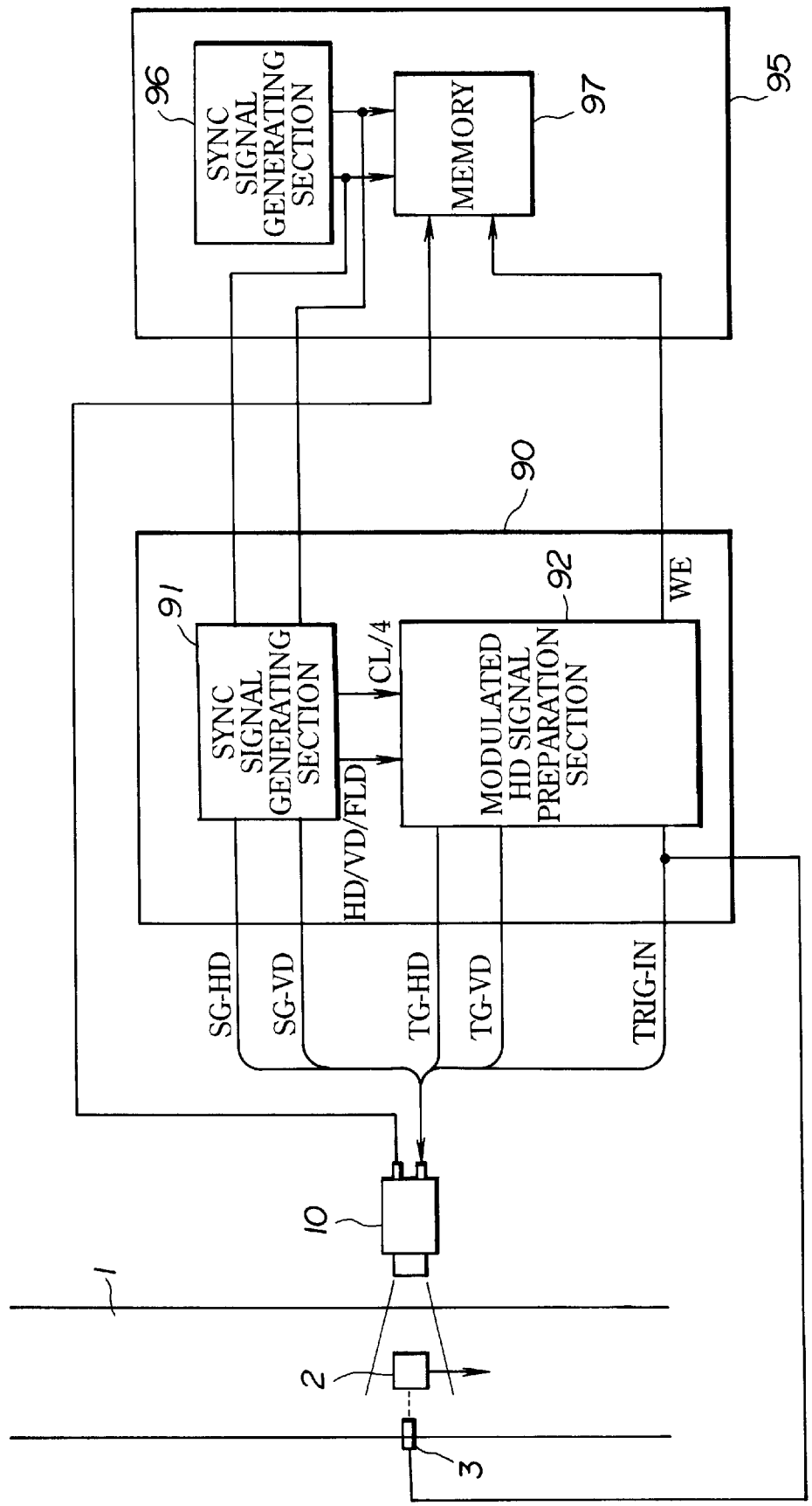
FIG. 26 is a block diagram showing another embodiment of the imaging system according to this invention.

In another embodiment shown in FIG. 26, an image processing unit 95 may be composed of a synchronizing signal generating section 96 having a function similar to that of the synchronizing signal generating section 31 shown in FIG. 7 and a memory 97, and a control unit 90 may be composed of a synchronizing signal generating section 91 having a function similar to the above-described synchronizing signal generating section 21 shown in FIG. 7 and a modulated HD signal preparation section 92 having a function similar to the above-described modulated HD signal preparation section 22 shown in FIG. 7 and operative to generate write enable signal WE immediately after the trigger signal TRIG-IN delivered from the position sensor 3 to deliver it to the memory 97 of the image taking-in unit 95.

In this case, in this imaging system, the modulated HD signal preparation section 92 generates write enable signal WE immediately after the trigger signal TRIG-IN delivered from the position sensor 3 to deliver it to the memory 97 of the image taking-in unit 95, and controls the output timing of the video signal from the CCD camera 10 similarly to the above-described imaging system shown in FIG. 7. The CCD camera 10 delivers the video signal to the image taking-in unit 95 at a timing synchronous with the write enable signal WE.

Thus, this imaging system can control the timing of the video signal delivered from the CCD camera 10 to the image taking-in unit 95 and securely carry out taking-in of image.

Moreover, in the above-described imaging system shown in FIG. 7, transfer of charges at the vertical transfer section of the CCD image sensor 11 of the CCD camera 10 is stopped by delivering the above-described CL/4 signal to the timing generator 13 as the modulated horizontal synchronizing signal TG-HD. However, a signal delivered to the timing generator 13 in order to stop transfer of charges in the vertical transfer section of the CCD image sensor 11 is not limited to the above-described CL/4 signal, but may be a signal having a frequency capable of stopping the counter of the timing generator 13, which counts times for forming the above-described vertical transfer signals V1 to V4, in more practical sense, a period less than a period 40 times greater than that of the clock CL.

Figure 27:
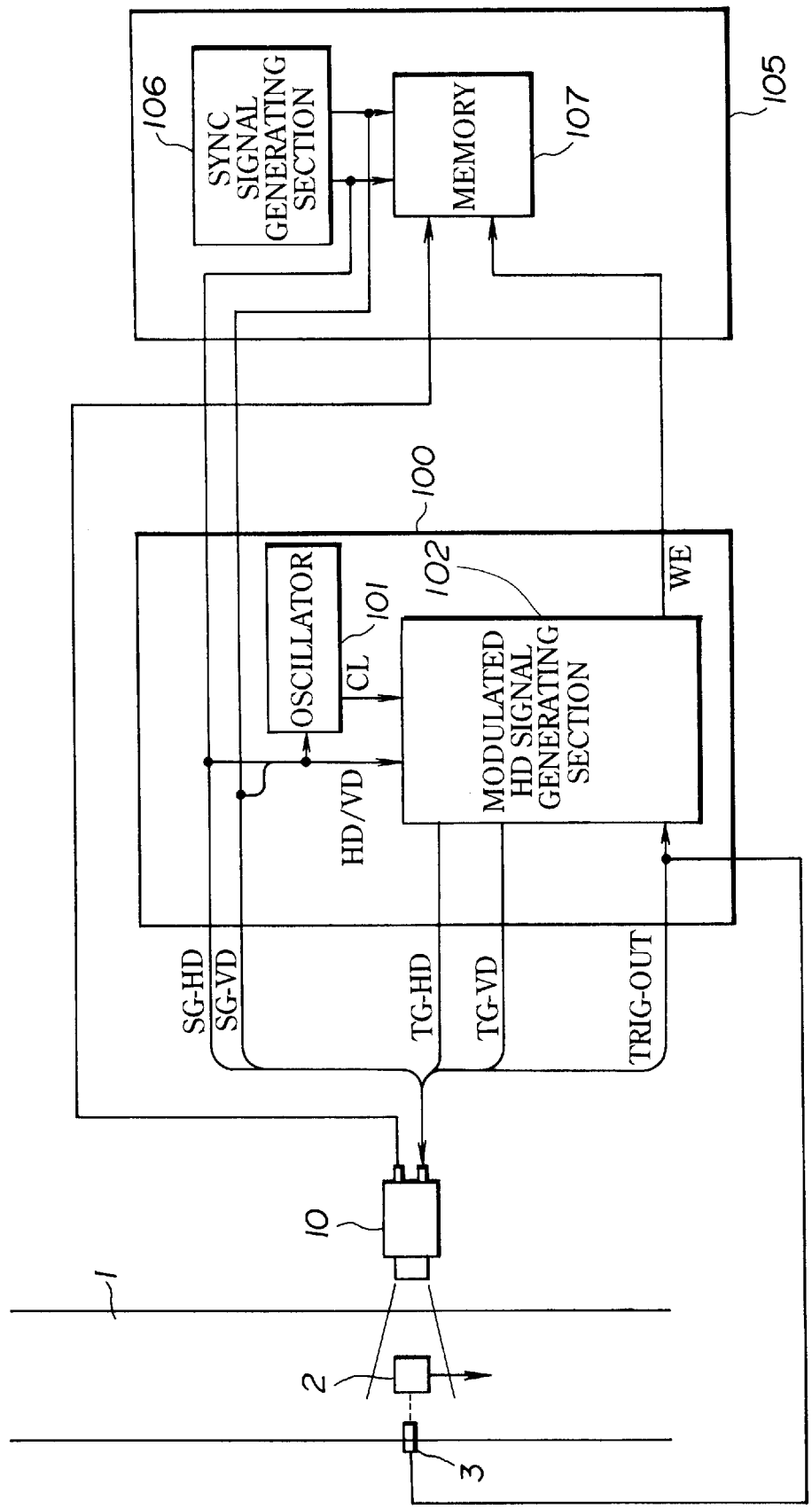
FIG. 27 is a block diagram showing a further embodiment of the imaging system according to this invention.

In another embodiment even when, as shown in FIG. 27, an image taking-in unit 105 is composed of a synchronizing signal generating unit 106 and a memory 107 similarly to the image taking-in unit 95 of FIG. 26, and a control unit 100 is composed of an oscillator 101 for generating clock CK having a period less than a period 40 times greater than the period of the clock CL, and a modulated HD signal generating section 102 for outputting a clock CK inserted modulated horizontal synchronizing signal TG-HD from the oscillator 101 for the vertical transfer stop period of the CCD image sensor 11 on the basis of the write enable signal WE, it is possible to control the output timing of a video signal from the CCD camera 10.

Moreover, in the imaging system shown in FIG. 27, generation of the write enable signal WE may be carried out at either the modulated HD signal generating section 102 or the image taking-in unit 105.

Figure 28:
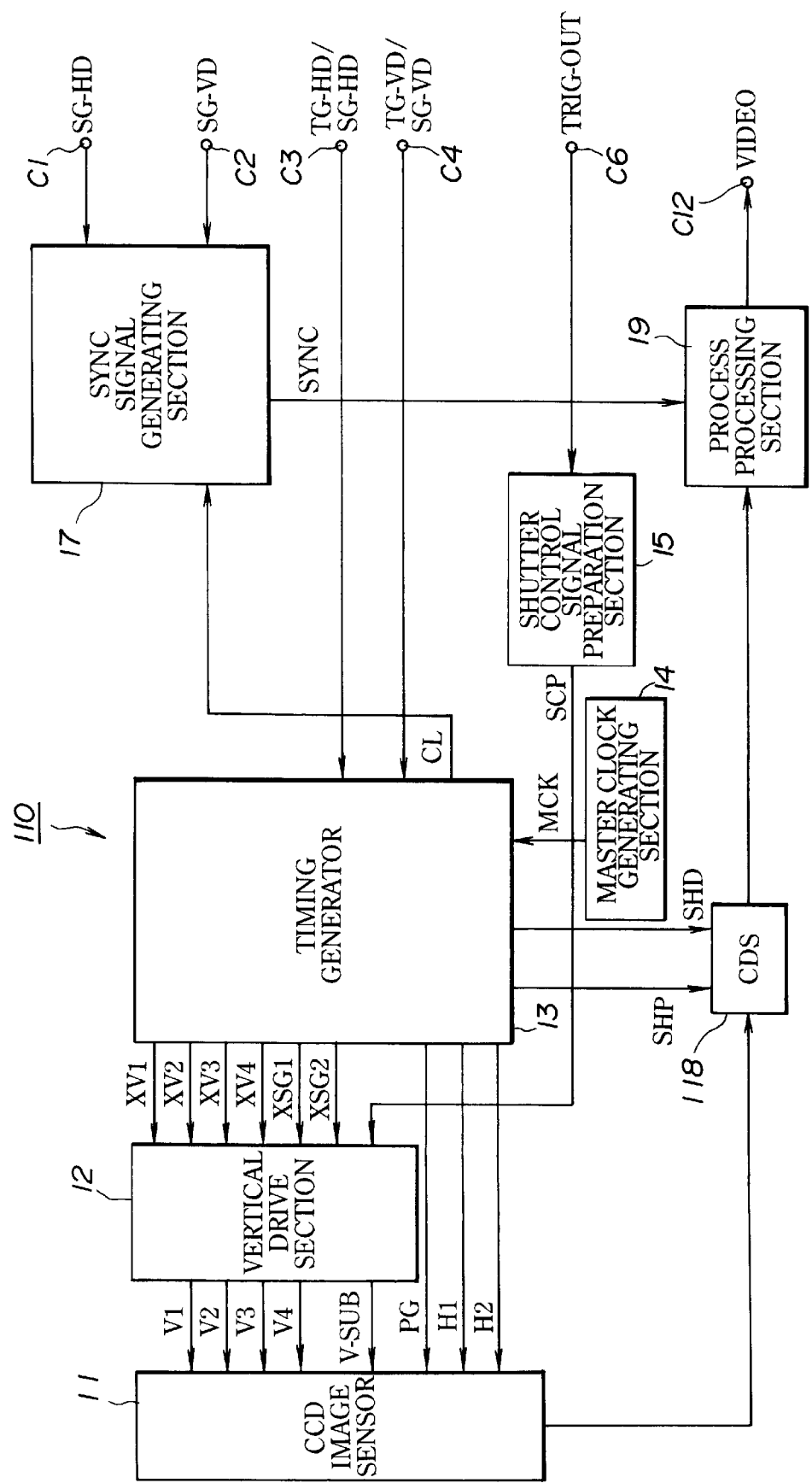
FIG. 28 is a block diagram showing another embodiment of the CCD camera constituting the imaging system according to this invention.

Further, while the above-described imaging system shown in FIG. 7 carries out switching of switches 16a, 16b provided at the CCD camera 10 to thereby conduct switching between the ordinary operation mode for carrying out image pick-up of moving picture on the basis of internal synchronizing signals IT-HD, IT-VD from the timing generator 13 and the random shutter mode for carrying out image pick-up of still picture in accordance with the trigger signal TRIG-OUT delivered from the terminal C6 and the modulated synchronizing signals TG-HD, TG-VD delivered to the terminals C3, C4, there may be employed a configuration such that the switches 16a, 16b are omitted to directly connect terminals C3, C4 to the timing generator 13 as in the CCD camera 110 shown in FIG. 28, for example, to selectively deliver modulated synchronizing signal TG-HD, TG-VD, or ordinary synchronizing signal SG-HD, SG-VD from the control unit 20 side to the timing generator 13 through the terminals C3, C4 to carry out switching of the operation mode at the control unit 20 side.

Further, while the above-described imaging system shown in FIG. 7 carries out control of the operation of the CCD camera 10 by the control unit 20 to take a video signal from the CCD camera 10 into the image taking-in unit 30, there is no necessity that the control unit 20 and the CCD camera 10 are separately provided. For example, there may be employed a configuration in which the CCD camera 10 is caused to have the function of the control unit 20 as in a CCD camera 120 shown in FIG. 29.

Figure 29:
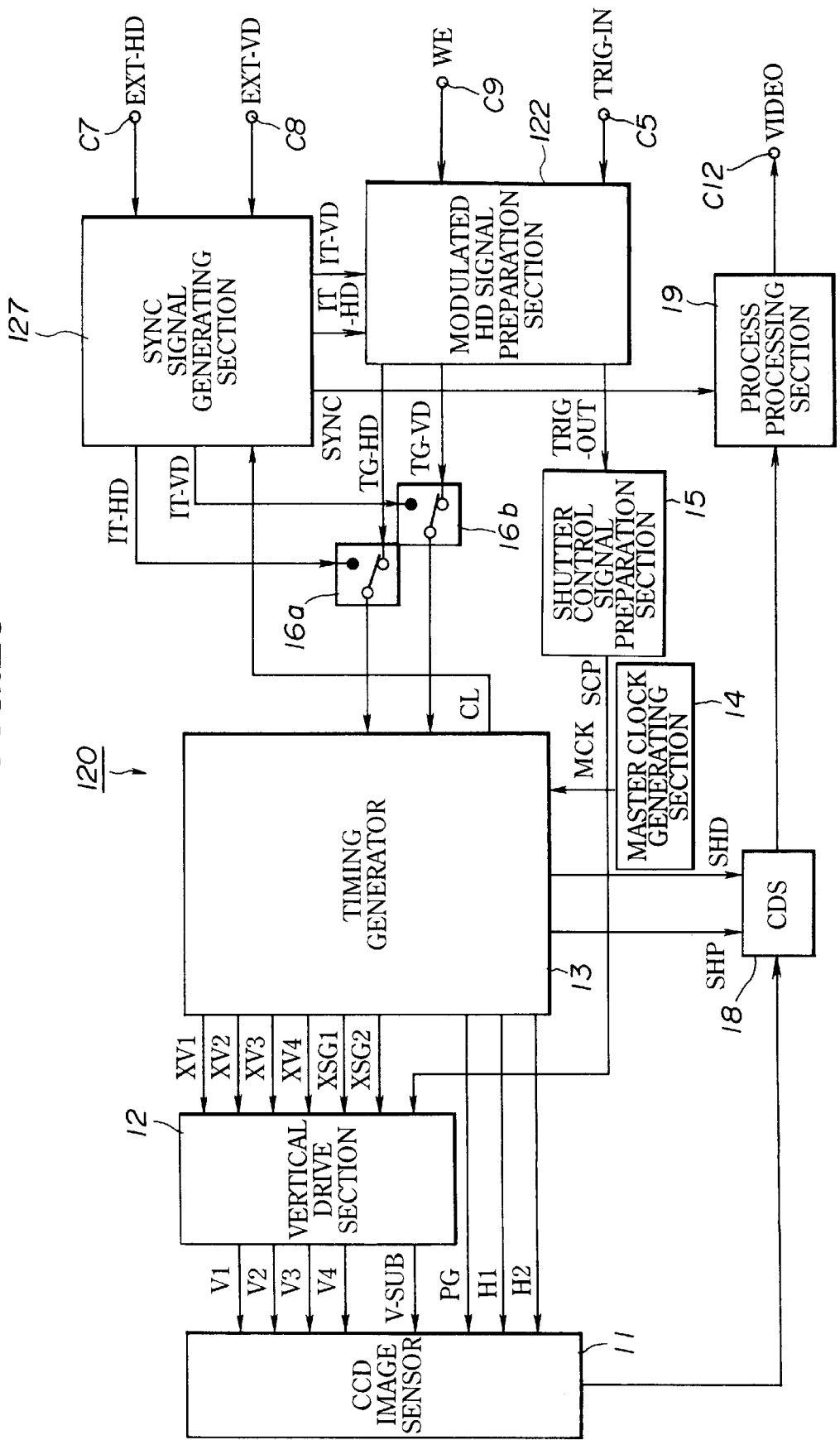
FIG. 29 is a block diagram showing a further embodiment of the CCD camera constituting the imaging system according to this invention.

Namely, the CCD camera 120 shown in FIG. 29 is of a structure in which the synchronizing signal generating section 21 and the modulated signal preparation section 22 constituting the control unit 20 in the above-described imaging system shown in FIG. 7 are provided on the CCD camera 10 side, and includes terminals C7, C8 supplied with external synchronizing signals EXT-HD, EXT-VD from the above-described image taking-in unit 30, terminal C9 supplied with write enable signal WE from the image taking-in unit 30, a synchronizing signal generating section 127 for generating internal synchronizing signals IT-HD, IT-VD on the basis of external synchronizing signals EXT-HD, EXT-VD delivered from the image taking-in unit 30 to the terminals C7, C8 to deliver the internal synchronizing signals IT-HD, IT-VD to the timing generator 13 through switches 16a, 16b, and a modulated HD signal preparation section 122 for preparing modulated synchronizing signals TG-HD, TG-VD on the basis of internal synchronizing signals IT-HD, IT-VD from the synchronizing signal generating section 127 and write enable signal WE, etc. delivered to the terminal C9 to deliver these modulated synchronizing signals TG-HD, TG-VD to the timing generator 13 through switches 16a, 16b.

When the CCD camera 120 of such a configuration is employed, the control unit 20 is omitted in the above-described imaging system shown in FIG. 7 to simplify the configuration, thus making it possible to control the timing at which a video signal is outputted from the CCD camera 120 in a manner to meet circumstances (needs) of the image taking-in unit 30. Thus, the image taking-in unit 30 can securely take image thereinto.

As described above, in accordance with this invention, it is possible to output an image pick-up signal from the solid-state image pick-up device at a timing where the write enable signal is delivered. Thus, it is possible to easily take synchronization with an external equipment, e.g., image taking-in unit, etc. For this reason, in accordance with this invention, it is possible to arbitrarily set the timing at which a video signal is outputted in a manner to meet circumstances (needs) of an external equipment. Thus, the degree of freedom in use is improved.

Moreover, in this invention, it is possible to output a video signal at a timing where write enable signal delivered from the image taking-in unit is delivered. Thus, the image taking-in unit can carry out taking-in of images in a manner caused to be easily synchronized with video signals. For this reason, in accordance with this invention, it is possible to control the timing at which an image pick-up signal is outputted from the image pick-up apparatus in a manner to meet circumstances (needs) of the image taking-in unit. Thus, the image taking-in unit can securely take images thereinto.

Further, in this invention, the image taking-in unit can take thereinto a video signal from the image pick-up apparatus at a timing where write enable signal is delivered from the image pick-up apparatus. For this reason, in accordance with this invention, it is possible to securely take thereinto image in a manner caused to be synchronized with an image pick-up signal from the image pick-up apparatus.

What is claimed is:

1. An image pick-up apparatus, comprising:

an interline transfer type solid-state image pick-up device including a light receiving section for producing charges corresponding to a quantity of light incident thereto, a vertical transfer section to which said charges produced in the light receiving section are transferred, a horizontal transfer section for outputting said charges transferred through said vertical transfer section, and a charge sweep-out section, wherein said interline transfer type solid-state image pick-up device has an electronic shutter function to sweep out said charges stored in said light receiving section into said charge sweep-out section in response to an electronic shutter control signal;

electronic shutter signal generating means supplied with a trigger signal to generate said electronic shutter control signal;

read-out signal generating means for generating a read-out signal for reading out said charges stored in said light receiving section and transferring said charges to said vertical transfer section as effective charges after a predetermined time has passed from the moment when said trigger signal is generated;

charge transfer stopping means for stopping vertical transfer of said effective charges in said vertical transfer section until said read-out signal is generated; and charge transfer starting means operative to release the stopped vertical transfer of said effective charges in said vertical transfer section by said charge stopping means when an external synchronizing signal generated to start the vertical transfer of said effective charges is produced so that said effective charges are output through said horizontal transfer section.

2. The image pick-up apparatus as set forth in claim 1, wherein said charge transfer starting means releases the stopped vertical transfer of said effective charges in said vertical transfer section when a field discrimination signal included in said external synchronizing signal indicates a start of one of an odd field and an even field starting the vertical transfer of said effective charges.

3. The image pick-up apparatus as set forth in claim 1, further comprising output request signal generating means for generating an output request signal at a predetermined timing based on said external synchronizing signal after said trigger signal is delivered, whereby said charge transfer starting means releases the stopped vertical transfer of said effective charges in said vertical transfer section when a field discrimination signal included in said external synchronizing signal indicates a start of one of an odd field and an even field after said output request signal is delivered starting the vertical transfer of said effective charges.

4. The image pick-up apparatus as set forth in claim 1, further comprising output request signal generating means for generating an output request signal at a predetermined timing based on said external synchronizing signal after said trigger signal is delivered, whereby said charge transfer starting means releases the stopped vertical transfer of said effective charges in said vertical transfer section when said external synchronizing signal indicates a start of a field existing at the beginning after said output request signal is delivered starting the vertical transfer of said effective charges.

5. An imaging system comprising:

an interline transfer type solid-state image pick-up device including a light receiving section for producing charges corresponding to a quantity of light incident thereto, a vertical transfer section to which said charges produced in the light receiving section are transferred, a horizontal transfer section for outputting said charges transferred through said vertical transfer section, and a charge sweep-out section, wherein said solid-state image pick up device has an electronic shutter function to sweep out said charges stored in said light receiving section into said charge sweep-out section in response to an electronic shutter control signal;

external synchronizing signal generating means for generating an external vertical synchronizing signal and an external horizontal synchronizing signal;

a trigger signal input terminal supplied with a trigger signal designating an image pick-up of an object;

modulated synchronizing signal generating means receiving said external vertical synchronizing signal and said external horizontal synchronizing signal and receiving said trigger signal for generating therefrom a modulated horizontal synchronizing signal having a frequency higher than that of said external horizontal synchronizing signal for a time period between a time after a predetermined time has passed from the delivering of said trigger signal to the trigger signal input terminal to a time based on said external horizontal synchronizing signal, said modulated horizontal synchronizing signal being fed to said image pick-up device to control a timing of a video signal output therefrom, and for generating an output vertical synchronizing signal based on said external vertical synchronizing signal;

electronic shutter signal generating means for generating said electronic shutter control signal for sweeping out said charges stored in said light receiving section into said charge sweep-out section in response to said trigger signal supplied at said trigger signal input terminal;

read-out signal generating means for generating a read-out signal for transferring said charges stored in said light receiving section to said vertical transfer section when a predetermined time has passed from the time when said trigger signal is received at said trigger signal input terminal;

vertical transfer signal generating means for generating in response to said electronic shutter control signal a vertical transfer signal for vertically transferring to said change sweep-out section said charges transferred to said vertical transfer section when a frequency of said modulated horizontal synchronizing signal is determined to be less than a predetermined frequency; and memory means for storing the video signal generated based on the charges outputted from said solid-state image pick-up device synchronized with said external vertical synchronizing signal, wherein said modulated synchronizing signal generating means generates a signal having a frequency higher than that of said external horizontal synchronizing signal as said modulated horizontal synchronizing signal for a time period from a time when a predetermined time has passed from the delivery of said trigger signal up to a time at which a field discrimination signal included in said external vertical synchronizing signal indicates a start of one of an odd field and an even field.

6. An imaging system comprising:

an interline transfer type solid-state image pick-up device including a light receiving section for producing charges corresponding to a quantity of light incident thereto, a vertical transfer section to which said charges produced in the light receiving section are transferred, a horizontal transfer section for outputting said charges transferred through said vertical transfer section, and a charge sweep-out section, wherein said solid-state image pick up device has an electronic shutter function to sweep out said charges stored in said light receiving section into said charge sweep-out section in response to an electronic shutter control signal;

external synchronizing signal generating means for generating an external vertical synchronizing signal and an external horizontal synchronizing signal;

a trigger signal input terminal supplied with a trigger signal designating an image pick-up of an object;

modulated synchronizing signal generating means receiving said external vertical synchronizing signal and said external horizontal synchronizing signal and receiving said trigger signal for generating therefrom a modulated horizontal synchronizing signal having a frequency higher than that of said external horizontal synchronizing signal for a time period between a time after a predetermined time has passed from the delivering of said trigger signal to the trigger signal input terminal to a time based on said external horizontal synchronizing signal, said modulated horizontal synchronizing signal being fed to said image pick-up device to control a timing of a video signal output therefrom, and for generating an output vertical synchronizing signal based on said external vertical synchronizing signal;

electronic shutter signal generating means for generating said electronic shutter control signal for sweeping out said charges stored in said light receiving section into said charge sweep-out section in response to said trigger signal supplied at said trigger signal input terminal;

read-out signal generating means for generating a read-out signal for transferring said charges stored in said light receiving section to said vertical transfer section when a predetermined time has passed from the time when said trigger signal is received at said trigger signal input terminal;

vertical transfer signal generating means for generating in response to said electronic shutter control signal a vertical transfer signal for vertically transferring to said change sweep-out section said charges transferred to said vertical transfer section when a frequency of said modulated horizontal synchronizing signal is determined to be less than a Predetermined frequency;

memory means for storing the video signal generated based on the charges outputted from said solid-state image pick-up device synchronized with said external vertical synchronizing signal; and output request signal generating means for generating an output request signal at a predetermined timing based on said external vertical synchronizing signal after said trigger signal is delivered, whereby said modulated synchronizing signal generating means generates a signal having a frequency higher than that of said external horizontal synchronizing signal as said modulated horizontal synchronizing signal for a time period from a time when a predetermined time has passed from the delivery of said trigger signal up to a time at which said output request signal is supplied and a field discrimination signal included in said external vertical synchronizing signal indicates a start of one of an odd field and an even field.

7. An imaging system comprising:

an interline transfer type solid-state image pick-up device including a light receiving section for producing charges corresponding to a quantity of light incident thereto, a vertical transfer section to which said charges produced in the light receiving section are transferred, a horizontal transfer section for outputting said charges transferred through said vertical transfer section, and a charge sweep-out section, wherein said solid-state image pick up device has an electronic shutter function to sweep out said charges stored in said light receiving section into said charge sweep-out section in response to an electronic shutter control signal;

external synchronizing signal generating means for generating an external vertical synchronizing signal and an external horizontal synchronizing signal;

a trigger signal input terminal supplied with a trigger signal designating an image pick-up of an object;

modulated synchronizing signal generating means receiving said external vertical synchronizing signal and said external horizontal synchronizing signal and receiving said trigger signal for generating therefrom a modulated horizontal synchronizing signal having a frequency higher than that of said external horizontal synchronizing signal for a time period between a time after a predetermined time has passed from the delivering of said trigger signal to the trigger signal input terminal to a time based on said external horizontal synchronizing signal, said modulated horizontal synchronizing signal being fed to said image pick-up device to control a timing of a video signal output therefrom, and for generating an output vertical synchronizing signal based on said external vertical synchronizing signal;

electronic shutter signal generating means for generating said electronic shutter control signal for sweeping out said charges stored in said light receiving section into said charge sweep-out section in response to said trigger signal supplied at said trigger signal input terminal;

read-out signal generating means for generating a read-out signal for transferring said charges stored in said light receiving section to said vertical transfer section when a predetermined time has passed from the time when said trigger signal is received at said trigger signal input terminal;

vertical transfer signal generating means for generating in response to said electronic shutter control signal a vertical transfer signal for vertically transferring to said change sweep-out section said charges transferred to said vertical transfer section when a frequency of said modulated horizontal synchronizing signal is determined to be less than a predetermined frequency;

memory means for storing the video signal generated based on the charges outputted from said solid-state image pick-up device synchronized with said external vertical synchronizing signal; and output request signal generating means for generating an output request signal at a predetermined timing based on said external vertical synchronizing signal after said trigger signal is delivered, whereby said modulated synchronizing signal generating means generates a signal having a frequency higher than that of said external horizontal synchronizing signal as said modulated horizontal synchronizing signal for a time period from a time when a predetermined time has passed from the delivery of said trigger signal up to a time at which said output request signal is delivered and said external vertical synchronizing signal indicates a start of a field existing at the beginning.

8. The control apparatus for controlling a timing operation of an image pick-up apparatus having an interline transfer type solid-state image pick-up device including a light receiving section for producing charges corresponding to a quantity of light incident thereto, a vertical transfer section to which said charges produced in the light receiving section are transferred, a horizontal transfer section for outputting said charges transferred through said vertical transfer section, and a charge sweep-out section, wherein said solid-state image pick up device has an electronic shutter function to sweep out said charges stored in said light receiving section into said charge sweep-out section in response to an electronic shutter control signal, the control apparatus comprising:

an external synchronizing signal input terminal supplied with an external vertical synchronizing signal and an external horizontal synchronizing signal;

a trigger signal input terminal supplied with a trigger signal designating an image pick-up of an object;

a trigger signal output terminal for outputting to the image pick-up apparatus an output trigger signal based on said trigger signal delivered to said trigger signal input terminal;

modulated synchronizing signal generating means synchronized with said external vertical synchronizing signal delivered to said external synchronizing signal input terminal and receiving said output trigger signal and said electronic shutter control signal for generating a modulated horizontal synchronizing signal having a frequency higher than that of said external horizontal synchronizing signal, in which a frequency of said modulated horizontal synchronizing signal is varied in accordance with said electronic shutter control signal, and for generating an output vertical synchronizing signal based on said external vertical synchronizing signal; and a modulated synchronizing signal output terminal for outputting said modulated horizontal synchronizing signal and said output vertical synchronizing signal to said image pick-up apparatus, wherein said modulated synchronizing signal generating means generates said modulated horizontal synchronizing signal for a time period from a time when a predetermined time has passed from the delivery of said trigger signal to the trigger signal input terminal up to a time at which a field discrimination signal included in said external vertical synchronizing signal indicates a start of one of an odd field and an even field.

9. A control apparatus for controlling a timing operation of an image pick-up apparatus having an interline transfer type solid-state image pick-up device including a light receiving section for producing charges corresponding to a quantity of light incident thereto, a vertical transfer section to which said charges produced in the light receiving section are transferred, a horizontal transfer section for outputting said charges transferred through said vertical transfer section, and a charge sweep-out section, wherein said solid-state image pick up device has an electronic shutter function to sweep out said charges stored in said light receiving section into said charge sweep-out section in response to an electronic shutter control signal, the control apparatus comprising:

an external synchronizing signal input terminal supplied with an external vertical synchronizing signal and an external horizontal synchronizing signal;

a trigger signal input terminal supplied with a trigger signal designating an image pick-up of an object;

a trigger signal output terminal for outputting to the image pick-up apparatus an output trigger signal based on said trigger signal delivered to said trigger signal input terminal;

modulated synchronizing signal generating means synchronized with said external vertical synchronizing signal delivered to said external synchronizing signal input terminal and receiving said output trigger signal and said electronic shutter control signal for generating a modulated horizontal synchronizing signal having a frequency higher than that of said external horizontal synchronizing signal, in which a frequency of said modulated horizontal synchronizing signal is varied in accordance with said electronic shutter control signal, and for generating an output vertical synchronizing signal based on said external vertical synchronizing signal;

a modulated synchronizing signal output terminal for outputting said modulated horizontal synchronizing signal and said output vertical synchronizing signal to said image pick-up apparatus; and output request signal generating means for generating an output request signal at a predetermined timing based on said external vertical synchronizing signal after said trigger signal is delivered, whereby said modulated synchronizing signal generating means generates said modulated horizontal synchronizing signal for a time period from a time when a predetermined time has passed from the delivery of said trigger signal up to a time at which said output request signal is delivered and a field discrimination signal included in said external vertical synchronizing signal indicates a start of one of an odd field and an even field.

10. A control apparatus for controlling a timing operation of an image pick-up apparatus having an interline transfer type solid-state image pick-up device including a light receiving section for producing charges corresponding to a quantity of light incident thereto, a vertical transfer section to which said charges produced in the light receiving section are transferred, a horizontal transfer section for outputting said charges transferred through said vertical transfer section, and a charge sweep-out section, wherein said solid-state image pick up device has an electronic shutter function to sweep out said charges stored in said light receiving section into said charge sweep-out section in response to an electronic shutter control signal, the control apparatus comprising:

an external synchronizing signal input terminal supplied with an external vertical synchronizing signal and an external horizontal synchronizing signal;

a trigger signal input terminal supplied with a trigger signal designating an image pick-up of an object;

a trigger signal output terminal for outputting to the image pick-up apparatus an output trigger signal based on said trigger signal delivered to said trigger signal input terminal;

modulated synchronizing signal generating means synchronized with said external vertical synchronizing signal delivered to said external synchronizing signal input terminal and receiving said output trigger signal and said electronic shutter control signal for generating a modulated horizontal synchronizing signal having a frequency higher than that of said external horizontal synchronizing signal, in which a frequency of said modulated horizontal synchronizing signal is varied in accordance with said electronic shutter control signal, and for generating an output vertical synchronizing signal based on said external vertical synchronizing signal;

a modulated synchronizing signal output terminal for outputting said modulated horizontal synchronizing signal and said output vertical synchronizing signal to said image pick-up apparatus; and output request signal generating means for generating an output request signal at a predetermined timing based on said external vertical synchronizing signal after said trigger signal is delivered, whereby said modulated synchronizing signal generating means generates said modulated horizontal synchronizing signal for a time period from a time when a predetermined time has passed from the delivery of said trigger signal up to a time at which said output request signal is delivered and said external vertical synchronizing signal indicates a start of a field existing at the beginning.

11. A control system for controlling a timing operation of an image pick-up apparatus having an interline transfer type solid-state image pick-up device including a light receiving section for generating charges corresponding to a quantity of light incident thereto, a vertical transfer section to which said charges produced in the light receiving section are transferred, a horizontal transfer section for outputting said charges transferred through said vertical transfer section, and a charge sweep-out section, wherein said solid-state image pick up device has an electronic shutter function to sweep out said charges stored in said light receiving section into said charge sweep-out section in response to an electronic shutter control signal, the system comprising:

external synchronizing signal generating means for generating an external vertical synchronizing signal and an external horizontal synchronizing signal;

a trigger signal input terminal supplied with a trigger signal designating an image pick-up of an object;

modulated synchronizing signal generating means receiving said external vertical synchronizing signal and said external horizontal synchronizing signal and receiving said trigger signal and being synchronized with said external vertical synchronizing signal for generating therefrom a modulated horizontal synchronizing signal having a frequency higher than that of said external horizontal synchronizing signal, said modulated horizontal synchronizing signal being fed to said image pick-up apparatus to control a timing of a video signal output therefrom, and for generating an output vertical synchronizing signal based on said external vertical synchronizing signal;

a modulated synchronizing signal output terminal for outputting said modulated horizontal synchronizing signal and said output vertical synchronizing signal to said image pick-up apparatus;

a video signal input terminal supplied with said video signal outputted from said image pick-up apparatus; and memory means for storing said video signal delivered to said video signal input terminal synchronized with said external vertical synchronizing signal, wherein said modulated synchronizing signal generating means generates said modulated horizontal synchronizing signal for a time period from a time when a predetermined time has passed from the delivery of said trigger signal up to a time at which a field discrimination signal included in said external vertical synchronizing signal indicates a start of one of an odd field and an even field.

12. A control system for controlling a timing operation of an image pick-up apparatus having an interline transfer type solid-state image pick-up device including a light receiving section for generating charges corresponding to a quantity of light incident thereto, a vertical transfer section to which said charges produced in the light receiving section are transferred, a horizontal transfer section for outputting said charges transferred through said vertical transfer section, and a charge sweep-out section, wherein said solid-state image pick up device has an electronic shutter function to sweep out said charges stored in said light receiving section into said charge sweep-out section in response to an electronic shutter control signal, the system comprising:

external synchronizing signal generating means for generating an external vertical synchronizing signal and an external horizontal synchronizing signal;

a trigger signal input terminal supplied with a trigger signal designating an image pick-up of an object;

modulated synchronizing signal generating means receiving said external vertical synchronizing signal and said external horizontal synchronizing signal and receiving said trigger signal and being synchronized with said external vertical synchronizing signal for generating therefrom a modulated horizontal synchronizing signal having a frequency higher than that of said external horizontal synchronizing signal, said modulated horizontal synchronizing signal being fed to said image pick-up apparatus to control a timing of a video signal output therefrom, and for generating an output vertical synchronizing signal based on said external vertical synchronizing signal;

a modulated synchronizing signal output terminal for outputting said modulated horizontal synchronizing signal and said output vertical synchronizing signal to said image pick-up apparatus;

a video signal input terminal supplied with said video signal outputted from said image pick-up apparatus;

memory means for storing said video signal delivered to said video signal input terminal synchronized with said external vertical synchronizing signal; and output request signal generating means for generating an output request signal at a predetermined timing based on said external vertical synchronizing signal after said trigger signal is delivered, whereby said modulated synchronizing signal generating means generates said modulated horizontal synchronizing signal for a time period from a time when a predetermined time has passed from the delivery of said trigger signal up to a time at which said output request signal is delivered and a discrimination signal included in said external vertical synchronizing signal indicates a start of one of an odd field and an even field.

13. A control system for controlling a timing operation of an image pick-up apparatus having an interline transfer type solid-state image pick-up device including a light receiving section for generating charges corresponding to a quantity of light incident thereto, a vertical transfer section to which said charges produced in the light receiving section are transferred, a horizontal transfer section for outputting said charges transferred through said vertical transfer section, and a charge sweep-out section, wherein said solid-state image pick up device has an electronic shutter function to sweep out said charges stored in said light receiving section into said charge sweep-out section in response to an electronic shutter control signal, the system comprising:

external synchronizing signal generating means for generating an external vertical synchronizing signal and an external horizontal synchronizing signal;

a trigger signal input terminal supplied with a trigger signal designating an image pick-up of an object;

modulated synchronizing signal generating means receiving said external vertical synchronizing signal and said external horizontal synchronizing signal and receiving said trigger signal and being synchronized with said external vertical synchronizing signal for generating therefrom a modulated horizontal synchronizing signal having a frequency higher than that of said external horizontal synchronizing signal, said modulated horizontal synchronizing signal being fed to said image pick-up apparatus to control a timing of a video signal output therefrom, and for generating an output vertical synchronizing signal based on said external vertical synchronizing signal;

a modulated synchronizing signal output terminal for outputting said modulated horizontal synchronizing signal and said output vertical synchronizing signal to said image pick-up apparatus;

a video signal input terminal supplied with said video signal outputted from said image pick-up apparatus;

memory means for storing said video signal delivered to said video signal input terminal synchronized with said external vertical synchronizing signal; and output request signal generating means for generating an output request signal at a predetermined timing based on said external vertical synchronizing signal after said trigger signal is delivered, whereby said modulated synchronizing signal generating means generates said modulated horizontal synchronizing signal for a time period from a time when a predetermined time has passed from the delivery of said trigger signal up to a time at which said output request signal is delivered and said external vertical synchronizing signal indicates a start of a field existing at the beginning.

* * * * *